United States Patent [19]
Martino

[11] Patent Number: 6,044,382
[45] Date of Patent: Mar. 28, 2000

[54] DATA TRANSACTION ASSEMBLY SERVER

[75] Inventor: Rocco L. Martino, Villanova, Pa.

[73] Assignee: Cyber Fone Technologies, Inc., Wayne, Pa.

[21] Appl. No.: 08/877,636

[22] Filed: Jun. 20, 1997

Related U.S. Application Data

[63] Continuation-in-part of application No. 08/446,546, May 19, 1995, Pat. No. 5,805,676.

[51] Int. Cl.[7] ............................ G06F 13/14; H04M 11/00
[52] U.S. Cl. ........................................ 707/505; 379/93.17
[58] Field of Search ................................ 705/3; 707/505; 379/93.01, 93.17, 93.25

[56] References Cited

U.S. PATENT DOCUMENTS

| | | | |
|---|---|---|---|
| 4,591,662 | 5/1986 | Legros et al. ...................... 179/2 DP |
| 4,598,171 | 7/1986 | Hanscom et al. ...................... 381/110 |
| 4,689,478 | 8/1987 | Hale et al. .............................. 379/96 |
| 4,776,016 | 10/1988 | Hansen ................................... 381/110 |
| 4,813,013 | 3/1989 | Dunn ...................................... 364/900 |
| 4,835,372 | 5/1989 | Gombrich et al. ...................... 379/93 |
| 4,851,999 | 7/1989 | Moriyama .............................. 364/400 |
| 4,858,121 | 8/1989 | Barber et al. .......................... 395/202 |
| 4,860,342 | 8/1989 | Danner .................................... 379/96 |
| 4,937,439 | 6/1990 | Wanninger et al. ................... 235/456 |
| 4,972,462 | 11/1990 | Shibata ..................................... 379/89 |
| 4,984,155 | 1/1991 | Geier et al. ............................. 364/401 |
| 4,991,199 | 2/1991 | Perekh et al. ............................ 379/97 |
| 5,008,927 | 4/1991 | Weiss et al. .............................. 379/98 |
| 5,047,960 | 9/1991 | Sloan ...................................... 364/523 |
| 5,189,632 | 2/1993 | Paajanen et al. ................. 364/705.05 |
| 5,195,086 | 3/1993 | Baumgartner et al. ................. 379/202 |
| 5,195,130 | 3/1993 | Weiss et al. .............................. 379/98 |
| 5,204,813 | 4/1993 | Samph et al. ........................... 364/419 |
| 5,278,751 | 1/1994 | Adiano et al. .......................... 364/402 |
| 5,301,105 | 4/1994 | Cummings, Jr. ................... 364/401 M |
| 5,333,266 | 7/1994 | Boaz et al. ............................... 379/89 |
| 5,351,076 | 9/1994 | Hata et al. ................................ 348/14 |
| 5,365,577 | 11/1994 | Davis et al. .............................. 379/96 |
| 5,410,646 | 4/1995 | Tondevold et al. ..................... 395/149 |
| 5,416,831 | 5/1995 | Chewning et al. ....................... 379/96 |
| 5,572,421 | 11/1996 | Altman et al. .......................... 395/203 |
| 5,704,029 | 12/1997 | Wright, Jr. .............................. 395/149 |
| 5,757,655 | 5/1998 | Shih et al. ............................... 364/489 |
| 5,805,676 | 9/1998 | Martino ................................ 379/93.17 |

Primary Examiner—Stephen S. Hong
Assistant Examiner—Robert D. Bourque
Attorney, Agent, or Firm—Woodcock Washburn Kurtz Mackiewicz & Norris LLP

[57] ABSTRACT

A form driven operating system which permits dynamic reconfiguration of any host processor into a virtual machine which supports any of a number of operating system independent applications. A data transaction assembly server (TAS) downloads menus and forms which are unique to each application requiring data to be input for local or remote processing. The data transactions and forms are exchanged between the TAS, which functions as a form driven operating system of the host computer, and a remote processor in a real-time fashion so that virtually any operating system independent software application may be implemented in which a form driven operating system may be used to facilitate input, and in which the data input into the form may be processed locally or remotely, returned as a data stream, and displayed to the user. The TAS merely requires a flash PROM for storing the TAS control firmware, a RAM for storing the data streams making up the forms and menus, and a small RAM which operates as an input/output transaction buffer for storing the data streams of the template and the user replies to the prompts during assembly of a data transaction.

36 Claims, 18 Drawing Sheets

FIG. 14

I. OBJECTIVE

A. Enter ID#.

B. Measure the number of times you breath per minute

C. Measure your Pulse for a minute and enter the # (refer to Pulse and BP). ☐☐

D. Measure Peak Flow and enter the # (use Peak Flow number) ☐☐

E. Measure Oxygen SAT and enter # (use Oximeter) ☐☐☐

F. How many times in the last 24 hours have you used the Red Inhaler? (Beta-Agonist). ☐☐

G. Use of Oxygen in the last 24 hours?  ☐ less  ☐ more  ☐ no change

II. SUBJECTIVE

A. Has your cough changed?  ☐ less  ☐ more  ☐ no change

B. Has the color of your Sputum changed?  ☐ yes  ☐ no

C. If yes, has it changed from clear to colored?  ☐ yes  ☐ no

1) What color  ☐ yellow  ☐ green  ☐ bloody

D. Has your shortness of breath changed?  ☐ better  ☐ worse  ☐ no change

E. Has your ability to walk changed?  ☐ better  ☐ worse  ☐ no change

DATA TRANSACTION ASSEMBLY SERVER

CROSS-REFERENCE TO RELATED APPLICATIONS

The present application is a continuation-in-part of U.S. patent application Ser. No. 08/446,546, filed May 19, 1995, now U.S. Pat. No. 5,805,676, the contents of which are hereby incorporated by reference.

BACKGROUND OF THE INVENTION

1. Field of the Invention

The present invention relates to a form driven operating system which permits dynamic reconfiguration of the host processor into a virtual machine which supports any of a number of operating system independent data transactions, and more particularly, to a data transaction assembly server which downloads data transactions representative of different applications. The respective applications are implemented using menus which navigate the user to application specific forms which facilitate the entry of data appropriate to that application. The resulting data transactions and forms are exchanged between the form driven operating system of the host computer and a remote processor in a real-time fashion so that virtually any operating system independent software application may be implemented in which the form driven operating system is used to facilitate input, and in which the data input into the form may be processed remotely, returned as a data stream, and displayed to the user in real-time.

2. Description of the Prior Art

Point-of-entry systems have been developed which incorporate computer processing capabilities into conventional telephones. For example, a computer/telephone apparatus is described in U.S. Pat. Nos. 5,195,130, 5,008,927, and 4,991,199 which configures a telephone as a programmable microcomputer which is operated through the standard telephone 12-key keypad. A programmable gate array is reconfigured to accommodate various types of software which require different hardware configurations but without actually reconfiguring the hardware. The reconfiguration data is received from a network host computer and is used by the programmable microcomputer to emulate the hardware of any of a plurality of service bureaus which communicate with the network host computer. In this manner, the telephone/computer is configured to communicate data to/from any of a number of different service bureaus via conventional telephone lines.

However, telephone/computer systems of the type described in the afore-mentioned patents are typically quite complicated and expensive and are limited by the types of operating software which can be downloaded from the network host computer. Also, such telephone/computer systems are relatively slow since the microcomputer must be reconfigured before it will permit communication with the requested service bureau. Because of these characteristic features, such telephone/computer systems are typically used in public locations and are not efficient for creating point-of-entry transactions in typical commercial or private settings. A point-of-entry transaction system is desired which does not have such limitations and which is operating system independent.

Elimination of the requirement of a conventional operating system, with its command interpreters, memory management functions, function schedulers, disk operation functions, and the like, to run application programs and the need to write and compile a number of individual application programs for each application implemented by the microprocessor of a data entry and/or transaction creation device would greatly decrease the cost of such a device. However, to date, this has not been possible because an operating system with the afore-mentioned features is needed to run the application programs which control the data communications and together handle discrete parts of the computer system. Unfortunately, such application programs require substantial amounts of local memory and substantial processing power for performing the desired functions. Also, the operating systems themselves tend to be quite costly to purchase and maintain.

Accordingly, a data entry system is desired which does not have the inherent limitations of conventional point-of-entry systems such as the requirement of a standard operating system for communication with a remote service bureau or file server. A data entry device and associated system is desired which performs a minimal amount of processing at the data entry device so that the data entry device may be as simple and inexpensive as possible, thereby bringing the cost of such a device into a range suitable for most commercial and private uses. It is also preferable that such a data entry device provide a wide range of functionality without requiring a complicated local operating system program and a plurality of applications programs for implementing functions other than simple hardware functions.

Typically, a microprocessor is viewed to be a general purpose computer which is modified by application programs into a special purpose computer. In other words, when an application program is loaded into and running on a host processor, the application program reconfigures the host processor into a special purpose computer whose function is determined by that application program. Unfortunately, to be able to run on a host computer, the application programs must be written in accordance with the protocols of the operating system loaded onto the host processor, such as Windows™ 3.11, Windows95™, DOS™, and the like. Typically, these operating systems require a great amount of memory and utilize a great deal of processor overhead to operate efficiently.

More recently, the application programs have been written in an operating system independent language developed by Sun Microsystems, Inc. known as JAVA. JAVA is a compiler with its own memory management and run-time module which can be adapted to each host processor and is thus independent of the host processor and the host processor's operating system. However, JAVA requires the application program to be compiled in JAVA. This individually compiled application program is then useable on any computer that has a JAVA enabler for executing the JAVA program. Hence, even with JAVA, specific application dependent programs must be written and then individually compiled. A simplified operating system environment is desired which allows dynamic reconfiguring of the host processor for each application without requiring the programming and compilation of code at the host processor for each application.

The present invention has been designed to meet these needs in the art.

SUMMARY OF THE INVENTION

A data transaction assembly server (TAS) in accordance with the invention which meets the above-mentioned needs in the art is preferably implemented in a transaction entry device that permits the user to organize and control all aspects of his or her personal transactions as well as any transactions that may occur in an office setting. The TAS of the invention may also be implemented in a personal computer or any other general purpose computer which emulates the transaction entry device. In its simplest terms, the TAS formats input data into a data transaction having content which is dependent upon the type of application to which the associated data pertains. These data transactions are then transferred to a local or remote database server which may or may not "explode" each data transaction into its component parts for updating all databases containing data to which the data in the component parts pertain. In this "transaction entry mode," the TAS of the invention permits the transaction entry device to function as a multi-purpose workstation. However, since the data transactions are created without the use of a conventional operating system or application programs, the transaction entry device is quite simple and inexpensive and may be readily integrated with the customer's desktop telephone or portable telephone, implemented on a disk, a board, or a PCMCIA card for insertion into a standard personal computer, or implemented in a video control box.

The transaction entry device is driven by a microprocessor which is, in turn, driven by the operating system independent transaction assembly (or application) server (TAS) of the invention which is generally implemented as data streams stored in a flash PROM. The TAS is absolutely self-contained in its relationship to the hardware of the transaction entry device or personal computer and in general performs the two basic functions of (1) generating a template or form from a data stream, where the template or form can be a report or a set of data options, and (2) developing a data transaction as the user inputs data in response to prompts in the template or form. TAS may also include a mechanism for device handling, e.g., for driving a display and providing data to a modem. Generally, the template generated by the TAS is a series of data streams read from a local flash memory or transmitted directly from an external source such as a database file server.

During operation, the data entered by the user in response to prompts in the template are accumulated into data transactions which are transmitted to an external database server individually or accumulated and sent as a batch, which may depend on the application. Unlike typical prior art systems, the data transactions need not be locally stored for processing by the local microprocessor once the data transaction has been completed. On the contrary, the only required storage in the transaction entry device is a flash PROM, PCMCIA card, or disk for storing the TAS, a random access memory (RAM), a PCMCIA card, or disk for storing the data streams used by the TAS to complete a form and for storing the modem numbers for the remote database servers, and the same or an additional small RAM which stores an externally received data stream and/or operates as an input/output transaction buffer for storing the data streams of the template and the user replies to the prompts in the template during assembly of a data transaction or transactions. In an interactive process, the RAM may store values for selection and branching to different data streams. In this manner, the TAS permits the transaction entry device to serve as an assembly point for one or more specific data transactions until they are ready for transmission to a local or a remote database server for processing and storage for use in the current or another application.

The data transaction or transactions, which may be requests for data or a process, formed by the transaction entry device is/are transmitted via cellular, wired, or wireless modem to a local or remote database server for processing and/or storage. The data transaction is received via standard protocols at the database server which, depending upon the application, stores the entire data transaction, explodes the data transaction to produce ancillary records which are then stored, and/or forwards the data transaction or some or all of the ancillary records to other database servers for updating other databases associated with those database servers. Also, in response to requests from the transaction entry device, any of the database servers may send data streams back to the transaction entry device for use in completing the fields in the data transaction or in displaying new forms or menus with new sets of data options or reports for selection. To the extent that these data streams sent to the transaction entry device are forms and menus for particular applications to be executed on the microprocessor, these data streams permit the host processor to be dynamically reconfigured for the application(s) represented by the data streams in a manner which is totally independent of conventional operating systems.

Preferably, the transaction assembly (application) server (TAS) controls a microprocessor such as an Intel 80386SX or higher, and is implemented as data stored on a computer readable medium for processing by the microprocessor. One or more megabytes of RAM (internal or external) are used for dynamically storing the data streams for the templates, one-half megabyte or more of flash PROM is used for storing the TAS, and a 128 kB or larger RAM buffer which functions as a transaction buffer is used for storing the data streams of the templates and the user responses until completion of the data transaction. In one embodiment of the invention, the RAM, the PROM, and a microprocessor are provided on an removable PCMCIA card for selectively reconfiguring the host computer. Alternatively, the TAS RAM and PROM may be located on a circuit board internal to the host computer or data transaction device.

A graphics or numeric display screen also may be provided for displaying the templates to the user for the entry of the data which will form the data transactions. Preferably, the graphics or numeric display screen is on the order of 25 lines by 40 characters or more for a desktop unit and 12 lines by 40 characters or more for a cellular unit. The actual size and colors used on the display may be determined by the user by responding to prompts in a setup template.

The transaction assembly (application) server (TAS) guides the user to the desired template via menu selections, where the menus and templates are stored in RAM as data streams and are called up by the TAS when selected by the user. Generally, the menus are treated as a special type of template or form. The templates stored in the RAM may be updated at any time to handle particular applications by reading in a new data set which has been created off-line and downloaded via cellular, wired or wireless modem or direct connection to the RAM of the transaction entry device. Alternatively, the data may be downloaded via an RS-232 input to RAM, to a PCMCIA card, or to a disk. The same connections may be used to provide an automatic read from a remote database or an automatic write to a remote database. New applications may be added simply by adding additional memory elements containing the necessary templates for the new application or by replacing the existing templates stored in the RAM with templates received from an external device. A new disk or PCMCIA card containing the new templates could also be substituted.

Since all data is entered as data transactions determined by templates tailored to particular applications, the user applications may be generalized so that no unique user application programs need to be written when a new application is added. The templates themselves may be created off-line, e.g., in response to prompts in a template used for template creation. However, if code is needed, or if a multimedia element is to be included in a data transaction, it can be appended to a data transaction as an additional parameter stream in the stream of data forming the data transaction. Also, since the nature of the data in the respective fields of the templates for particular applications is known in advance, the interface to a database server to permit storage of the data transactions and their component parts in the appropriate databases in the appropriate formats for each database becomes much simpler.

In a preferred embodiment of the invention, the transaction assembly (application) server (TAS) permits the user to select a set of forms to download for a particular application. The forms are downloaded as data byte streams and stored in a non-volatile flash memory or disk or a volatile memory such as RAM. When the forms are being completed by the user, a cellular, wired or wireless modem connection of the data transaction device may be used to acquire desired data for completing the forms from remote databases. On the other hand, the modem connection may be used to download new forms or menus of associated data options. Data processing for a particular application may proceed in an interactive manner until all of the desired data has been entered. For example, interactive techniques using TAS forms may be used to provide home banking, retail shopping (with or without rebates), fund raising techniques, telemarketing, hotel and airlines reservations, and home use medical systems for inputting vital signs data and the like to permit a patient to be remotely monitored with or without the assistance of medical personnel. Alternatively, the TAS and its associated microprocessor may be part of a medical or bank kiosk, a medical or banking facility, or plugged into a television, videophone, or a medical imaging system, such as CAT scanner, MRI device, and the like.

In an alternative embodiment of the invention, two or more data transaction devices with form driven operating systems in accordance with the invention may be set up to communicate with each other to provide a simple, inexpensive small data network. For example, a simple, small scale data network may be created without conventional HUBs, Ethernet cards, and/or network software by simply connecting two or more data transaction devices with a TAS so that they communicate via a cellular, wired or wireless modem or null modem (connector), as in the case of a small network in a residential home or small office. Data transactions are sent from device to device by filling out respective forms and communicating the data via modem (or null modem) as data transactions. The data transactions merely need to contain the address of the destination device, and each device needs to merely look for data addressed to it and to ignore all other data transactions. Thus, each device having a TAS effectively functions as a data transaction "tuner" which only receives data transactions addressed to it. Due to this characteristic of the system, there is no need to resolve data conflicts, thereby greatly simplifying the transmission hardware and software.

In particular implementations of the TAS of the invention, it is further contemplated that TAS can be implemented as part of a stand alone data transaction device which is reconfigurable to virtually any application for which data may be entered into forms and transmitted as data transactions, in a portable computer, or in a cellular telephone adapted to include a small display for presenting TAS forms. The data transactions created by TAS during the completion of a form can be broadcast via the Internet or via the telephone system using a cellular, wired, or wireless modem and received by particular database servers which "tune" to data transactions having the designated source address. Alternatively, the TAS may "tune" into the Internet to download from web sites and to collect and distribute e-mail. TAS may also be used to setup browser search requests and send the associated search codes to the Internet browsers for search. TAS may also allow the user to store phone numbers, names, addresses, and the like compressed in a flash PROM or RAM for recall. Other applications of the invention will also be apparent to those skilled in the art based on the following detailed description of the invention.

BRIEF DESCRIPTION OF THE DRAWINGS

The above-mentioned characteristic features of the invention will become more apparent to those skilled in the art in view of the following detailed description of the invention, of which:

FIG. 14 is a sample form for the home health care (remote monitoring) embodiment of FIG. 13.

DETAILED DESCRIPTION OF THE PRESENTLY PREFERRED EMBODIMENT

Figure 1:
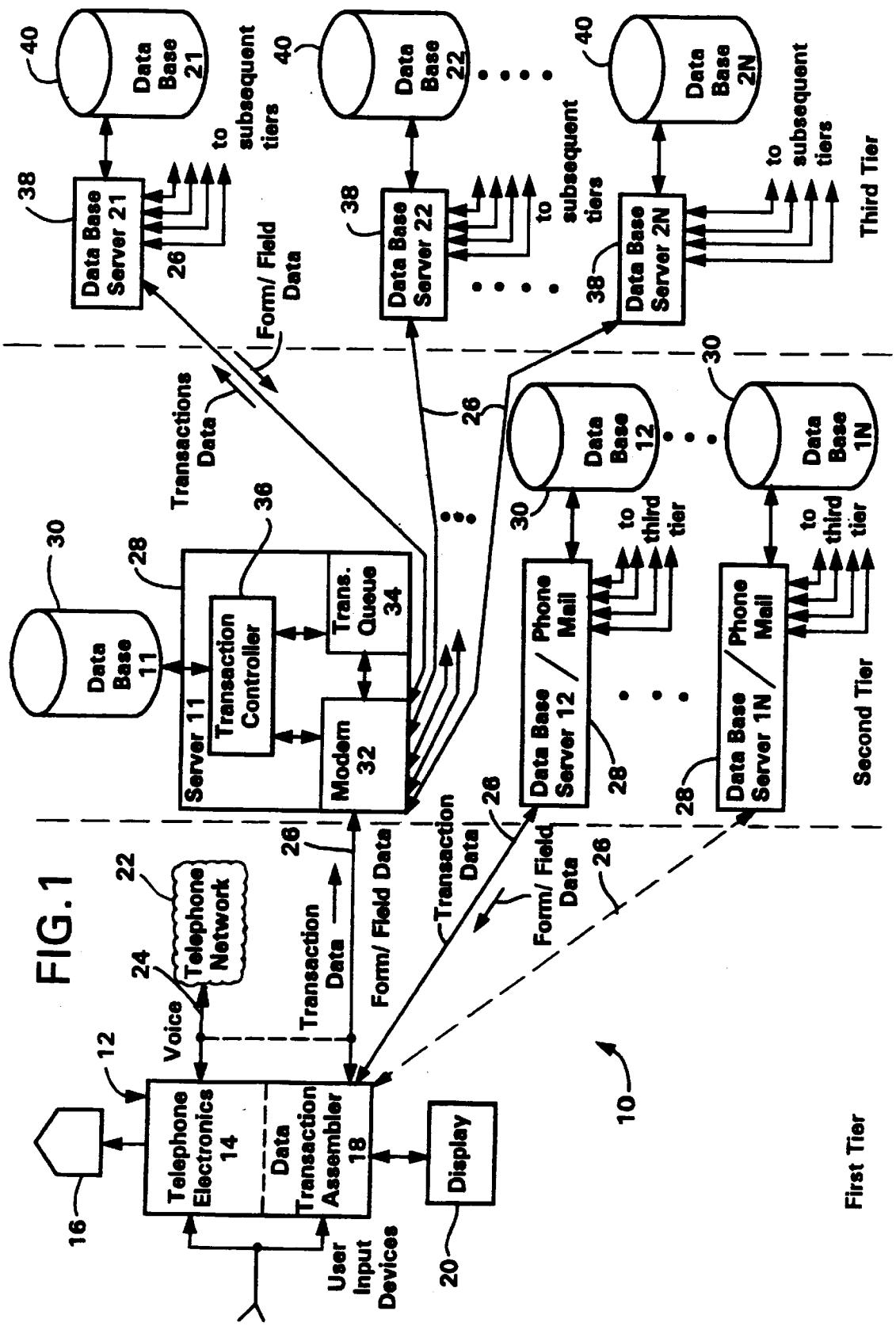
FIG. 1 is a schematic diagram of a system for entering data transactions into databases in accordance with the invention.

A system and method which meets the above-mentioned objects and provides other beneficial features in accordance with the presently preferred exemplary embodiments of the invention will be described below with reference to FIGS. 1–15. Those skilled in the art will readily appreciate that the description given herein with respect to those figures is for explanatory purposes only and is not intended in any way to limit the scope of the invention. For example, those skilled in the art will appreciate that the telephone/transaction entry device and system for entering data transactions into remote databases in accordance with the invention may be used in numerous settings in numerous applications. Accordingly, all questions regarding the scope of the invention should be resolved by referring to the appended claims.

A. System Description

1. Overview

The system of the invention provides a simplified form driven operating system which permits all data to be input as data transactions which are determined by templates (forms) tailored to each application handled by the processor. Menus are provided to navigate to the desired forms. Thus, when a particular application is desired, the user simply navigates through the menus to select the desired form. The user then completes the form and transmits it to a local or remote server for processing. As a result, no unique user application program needs to be written for the processor when a new application is added: only the menus and forms needed for the new application need to be downloaded. As will be explained in more detail below, a transaction assembly (application) server (TAS) permits the user to select a set of forms to download from a remote server for a particular application. The selected forms are downloaded as byte streams and stored in a non-volatile flash memory, PCMCIA card, or disk or a volatile RAM memory. The forms are completed by the user directly or using interactive techniques in which certain of the data requested by the forms is obtained from remote databases via other servers. Data transaction processing for a particular application specified by the menus and forms proceeds in an interactive manner until all of the desired data has been entered, transmitted, and processed.

A first embodiment of a system implementing such a form driven operating system is used for the automatic capture and computerization of data associated with data transactions as they occur. Additional system embodiments will be described for creating a computer system which is totally reconfigurable for new applications by simply downloading new sets of menus and forms as data transactions. Such system embodiments include home banking or retail shopping, home use medical monitoring, a simple, inexpensive small data network, a visible phone mail menu, hotel and airlines reservations, fund raising techniques, and telemarketing. Alternatively, the TAS and its associated microprocessor may be part of a medical or bank kiosk, a medical or banking facility, or plugged into a television, videophone, or a medical imaging system, such as CAT scanner, MRI device, and the like. The data transactions created by TAS during the completion of a form can be broadcast via the Internet or via the telephone system using a cellular, wired or wireless modem and received by particular database servers which "tune" to data transactions having the designated source address. Alternatively, the TAS may "tune" into the Internet to download from web sites and to collect and distribute e-mail. TAS may also be used to setup browser search requests and send the associated search codes to the Internet browsers for search. TAS may also allow the user to store phone numbers, names, addresses, and the like compressed in a flash PROM or RAM for recall.

As used herein, a data transaction is the combination of a form or template or a series of forms or templates containing data entry prompts and the data entered in response to those prompts; however, in certain circumstances, the data transaction actually transmitted may include only the data entered in response to the prompts in the template. Throughout this specification, the words "form" and "template" are used interchangeably.

The data transactions are generated by a transaction entry device through an interactive process between the user and the form. The data transaction is assembled in a transaction buffer in the data transaction entry device and then transmitted one at a time or in a batch to an external database for storage and processing. No local storage for data transactions is necessary except as desired to permit the data transactions to be sent in batches or if local processing is desired, as when the data transaction entry device of the invention is being emulated on a personal computer. The data transaction is defined externally by the database in that all applications consist of a series of customized forms and prompts for soliciting entry of the data needed to update the databases or to provide data for a particular application to another data processing device as a data stream. Generally, the data transaction will have a one-to-many relationship to the file structures of the database containing data for that application, although the data transaction may have a single application specific file structure for communicating data to another similarly configured data processing device.

In a first embodiment of the invention, the data transactions are entered using a transaction entry device which is integrated with telephone electronics so that the resulting device may selectively operate as a conventional telephone or as a data transaction entry device. The resulting transaction entry device preferably includes a touch screen, a keyboard, a portable (infrared) mouse, and/or a 10 key touch tone keypad or "sounder"device which provides input to a transaction assembly (application) server (TAS) which, in turn, presents selection options via menus and forms for completion by the user. Menu and form selection and form completion is made by touch, by key selection from the keyboard, by moving a cursor to the appropriate selection point and depressing a key, or even by voice command (which is particularly useful if the input is simple commands or numerics). Whenever data entry (other than mere selection) is desired, it is accomplished via a menu-driven selection process and/or by direct entry of data using a keyboard, a keypad, a touch screen, a mouse, and the like. In the menu-driven case, a set of options is presented to the display screen by the TAS. If this set of options exceeds the capacity of the display screen, then the list is scrolled up or down through the use of scroll keys on the device, by voice command, or by touch at scroll command points. Once the selection is made, the data associated with that selection is automatically entered into the form by interaction with a local or remote database, or the data is input by the user. In the event of keyboard entry, the TAS may present a keyboard at the bottom of the display screen for touch entry; alternately, an optional keyboard located at the base of the transaction entry device or an external keyboard, keypad, or DTMF generating device (for touch tones) may be used.

When the data is entered independently of a selection process, such data also may be entered using a swipe card, PCMCIA memory card, smart card, a CD ROM, a floppy disk, and the like, if the data resides on the card, or the data may be transferred into the data transaction via cellular, wired or wireless modem from an external source. The data read from the card or received via modem can be used to fill out a form or may be transmitted to an external database or computer. Data returned from the external database or computer via modem may also be used to interactively fill out the fields in the form. As desired, the data in a data transaction may also be written to a swipe card, smart card, PCMCIA memory card, writable CD ROM, floppy disk, and the like.

The TAS of the invention stores the options as well as control programs (microcode) for the processor for use with the templates in creating the data transactions. The TAS also includes a program allowing connection via cellular, wired or wireless modem to one or more external computers and databases. Preferably, two modes of operation are available: transaction entry mode (with or without modem connection) and telephone mode. A selection of either the transaction entry mode or the telephone mode is made through a switch selection on the transaction entry device.

When the transaction entry device is placed in the transaction entry mode, the TAS immediately enables the telephone keypad and presents a selection menu for all of the options the system is programmed to handle. However, if the transaction entry device is implemented on a disk, PCMCIA card, and the like, the card or board containing the necessary software (TAS) must be inserted prior to operation. In the telephone mode, on the other hand, the telephone keypad is enabled and a dial tone is provided. In telephone mode, one or more lines may be connected so as to allow simultaneous use of the transaction entry device without interfering with the modem connection. However, if a single telephone line is used, the telephone capability is available at all times or intermittently via cellular, wired or wireless modem as specified by the particular application. In the intermittent mode, upon a "save" the transaction entry device will control a dial up and transfer of data to a remote database server. On the other hand, if the telephone is used with an automatic dialer mechanism utilizing a phone list, the transaction entry device may automatically change from the telephone mode to the transaction entry mode. In this case, a display on the telephone or an associated computer display screen may be used to present a name and telephone list from which a selection can be made.

Other embodiments of the invention provide transaction entry devices or host computers including transaction assembly (application) servers which permit such systems to be reconfigured for each application specified by a form. The form facilitates the entry of data for local or remote processing without the requirement of a conventional operating system for memory management functions, command interpretation, function scheduling, disk operation, and the like, although some form of device handling for driving, for example, the display, is still desirable. Such conventional operating system functions becomes unnecessary since all data is input/output through a data transaction buffer for remote or off-line processing and since only a single application is processed at a time for each set of forms. As will be explained in more detail below, such characteristics of the invention permit a conventional processor to be inexpensively reconfigured as a "virtual" application computer which does not require the purchase of a single application program or a complex operating system for operation.

2. Data Transaction System (FIGS. 1–4)

FIG. 1 is a schematic diagram of a system 10 for entering data transactions into databases in accordance with a first embodiment of the invention. As illustrated, system 10 comprises a first tier for capturing a data transaction having a one-to-many relationship to file structures, a second tier for exploding the data transaction into component parts having a one-to-one relationship to file structures, and a third tier for providing additional explosion of the data transactions for specific applications.

The first tier comprises a transaction entry device 12 which captures the data transaction from the user in response to any of a plurality of inputs from the user. Transaction entry device 12 includes conventional telephone electronics 14 and speaker 16 and a data transaction assembly server (TAS) 18 for creating a data transaction in accordance with the invention. A display screen 20 is preferably associated with TAS 18 so that the user may monitor creation of each data transaction. Telephone electronics 14 are connected to a telephone switching network 22 via a conventional voice connection 24 over the cellular, wired and/or wireless telephone lines, while TAS 18 is connected via cellular, wired and/or wireless telephone lines 26 to one or more database servers 28. As illustrated in FIG. 1, telephone lines 24 and 26 may be separate lines, thereby permitting simultaneous use of the telephone and data entry functions, or the telephone electronics 14 and TAS 18 may be connected to a single line as illustrated in phantom in FIG. 1. Of course, when the telephone electronics 14 and TAS 18 are connected to a single line, a mode switch will enable their mutually exclusive operation, or alternatively, any of a number of conventional transmission schemes may be used to permit simultaneous transmission of the voice from the telephone electronics 14 and the data from the TAS 18 over the same line.

During operation in the transaction entry mode, transaction entry device 12 is responsive to user input devices such as a touch screen, a telephone keypad, a keyboard, a microphone, a swipe card, a memory card, video input, and the like, to form data transactions using TAS 18. Alternatively, the transaction entry device 12 operates in a telephone mode as a conventional telephone and receives inputs from a microphone and/or a handset, a touch tone keypad, and the like. More details of the transaction entry device 12 and TAS 18 will be provided in the next sections with respect to FIGS. 5–10.

The second tier comprises one or more database servers 28 and their associated databases 30. In general, each database server 28 receives data transactions from one or more transaction entry devices 12 and "explodes" the received data transactions into their component parts for storage in the appropriate files of the associated database 30. In other words, the one-to-many file structure of the data transactions from one or more transaction entry devices 12 is converted into many one-to-one data transactions for storage in individual files of database 30.

Each database server 28 includes a cellular, wired or wireless modem 32 for transmitting/receiving data from the telephone lines 26, particularly the data transactions from one or more transaction entry devices 12. Preferably, the data transactions are transmitted over the telephone lines 26 as data packets having, for example, 128 bytes, where 120 bytes contain information and 8 bytes contain control data. A transaction queue 34 acts as an input buffer for the received data transactions and controls the rate of presentation of the data transactions to transaction controller 36. Transaction controller 36 processes the received data transactions to extract the physical file relationships of the component parts of the data transactions and stores the components parts and different combinations thereof in the appropriate files of associated database 30. Alternatively, transaction controller 36 may process a data request from TAS 18 requesting information from database 30 for completing certain fields of a data transaction being prepared by the transaction entry device 12. Database 30 then provides the requested information to database server 28 which, via modem 32, provides a data stream back to TAS 18 for use in completing the data transactions or presenting additional menus and forms for use in completing the data transactions in accordance with the invention. Typically, a user ID and password are transmitted to the transaction controller 36 to permit a connection to be made by TAS 18. Thus, transaction controller 36 also checks and stores startup and logoff information in addition to storing data transactions and directing reconstituted data transactions to other database servers as described herein. In addition, database server 28 may include a conventional phone mail system with an associated database for storing voice mail messages. In this case, the data transaction may include voice data for storage in the remote voice mail system.

As shown in FIG. 1, several database servers 28 may be provided. Preferably, each transaction entry device 12 has an associated database server 28 for performing any desired processing of its data transactions, although it is preferred that the data transactions be copied to at least one other database server 28 as shown in FIG. 1. This redundancy minimizes the possibility of losing data in the event of a power outage and the like. Preferably, each database server 28 contains essentially the same hardware, although modem 32, transaction queue 34, and transaction controller 36 have not been shown for all database servers 28 for ease of illustration.

In transaction entry mode, the TAS 18 of transaction entry device 12 creates a data transaction that is transmitted to an associated transaction controller 36 of an associated database server 28. By "associated" it is meant that the database server 28 functions to perform any processing requested or necessary in conjunction with the storage of a data transaction from a particular transaction entry device 12. Of course, a particular database server 28 may have several transaction entry devices 12 associated with it, and vice-versa. So that no data will be lost, a particular database server 28 may also serve as a backup for another database server 28 in the event of the failure of any database server 28.

As will be explained in more detail below with respect to FIGS. 2–4, database server 28 "explodes" data transactions received from TAS 18 and provides the component parts of the "exploded" file dependent data transactions via modem 32 to other database servers 28 as necessary to update other databases. Alternatively, the "explosion" of the data transactions may be performed by the TAS 18 at the transaction entry device 12 and the component parts transmitted to all appropriate databases 28 for updating the data therein. For this purpose, the TAS 18 will also need to know the modem numbers for all database servers 28 to be updated by the exploded data transactions. However, those skilled in the art will appreciate that this latter alternative will require access to numerous phone lines by the transaction entry device and that such phone lines are not always available to the user.

Finally, the third tier of the system 10 includes additional database servers 38 and databases 40 which support file dependent data transactions for specific applications. This additional tier of database servers 38 and databases 40 permits the data in the data transactions to be routed to application specific databases for storage of application specific data and access by those transaction entry devices 12 requesting data related to that specific application.

The creation and storage of a data transaction in accordance with the invention now will be described with respect to FIGS. 2–4.

Data transactions are created by TAS 18 as a data stream of a known format. A generic data transaction is illustrated in FIG. 2. As defined herein, a data transaction is created using a form containing one or more of the following: instructions, prompts, menu selection options, and a template with fields for data entry. Generally, the menu form consists of prompts for selecting a form, another menu, or a process, and a single slot for entering a selection, while the data entry form consists of prompts and instructions together with fields for entering data, as shown in FIG. 2. The data entry form can have either single or multiple fields for entering data.

In transaction entry mode, the user navigates through menus of TAS 18 until a form related to a particular type of data entry operation is selected. Once selected, data transaction form 42 is presented to the user on display device 20. The data transaction form 42 is a collection of data defining the visual presentation on the display device 20 and a list of the fields through which linkages to external database files are defined.

Figure 2:
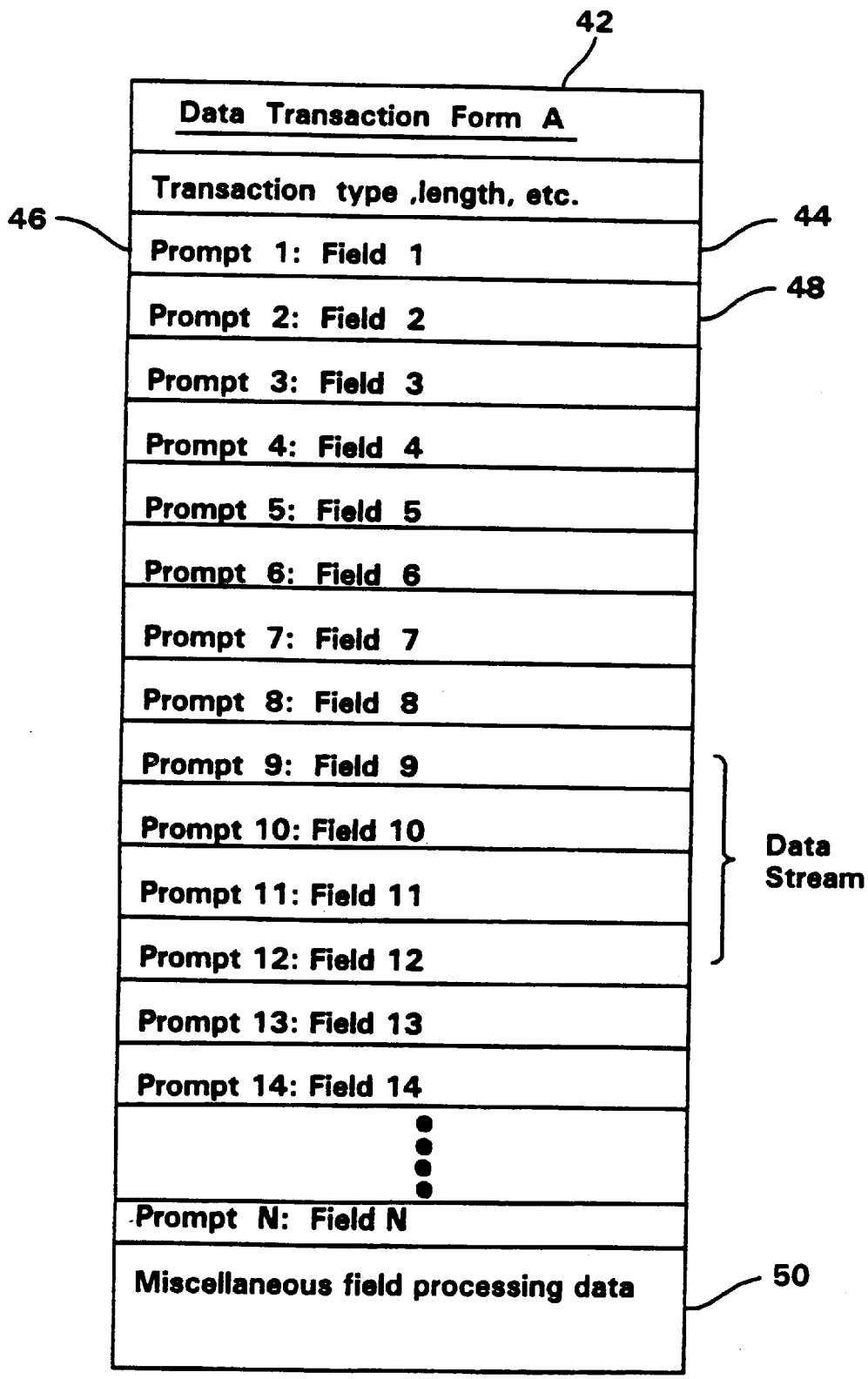
FIG. 2 illustrates a generic template for use in creating a data transaction in accordance with the invention.

As shown in FIG. 2, data transaction form 42 includes a format field 44 which identifies the type of data transaction this form pertains to, the length of the form, the number of pages in the form, the number of bytes in each field, storage keys, and the like. The body of the data transaction form 42 comprises a predetermined series of prompts 46 which are provided to the display screen 20 as a data stream. The prompts preferably include descriptive data which may be alphanumeric, an icon, or a list that scrolls, if necessary. Fields 48 are blank spaces of predetermined size provided for accepting user input in response to each prompt. Generally, the size of each field 48 is also stored in the stream of data defining the data transaction form 42. Since the prompts are tailored to elicit the necessary data for the application for which the data transaction form 42 was created, the fields 48 will include the user data necessary for processing a data transaction for that particular type of application. The user responses become part of the data stream which forms the data transaction. Typically, the data transaction form 42 also includes a miscellaneous processing field 50 which permits processing data unique to that form to be appended to the data transaction for transmission. Such processing data may include, for example, equations which define the relationships of the data in certain fields of the data transaction or audio or video data attached to a multimedia data transaction. In addition, non-display data associated with the time of data entry, the date of data entry, the user ID, and the like may be stored in miscellaneous processing field 50. In addition, vital signs data and the like may be placed in miscellaneous processing field 50 when the transaction entry device 12 is used in a remote medical monitoring environment (described below).

Figure 3:
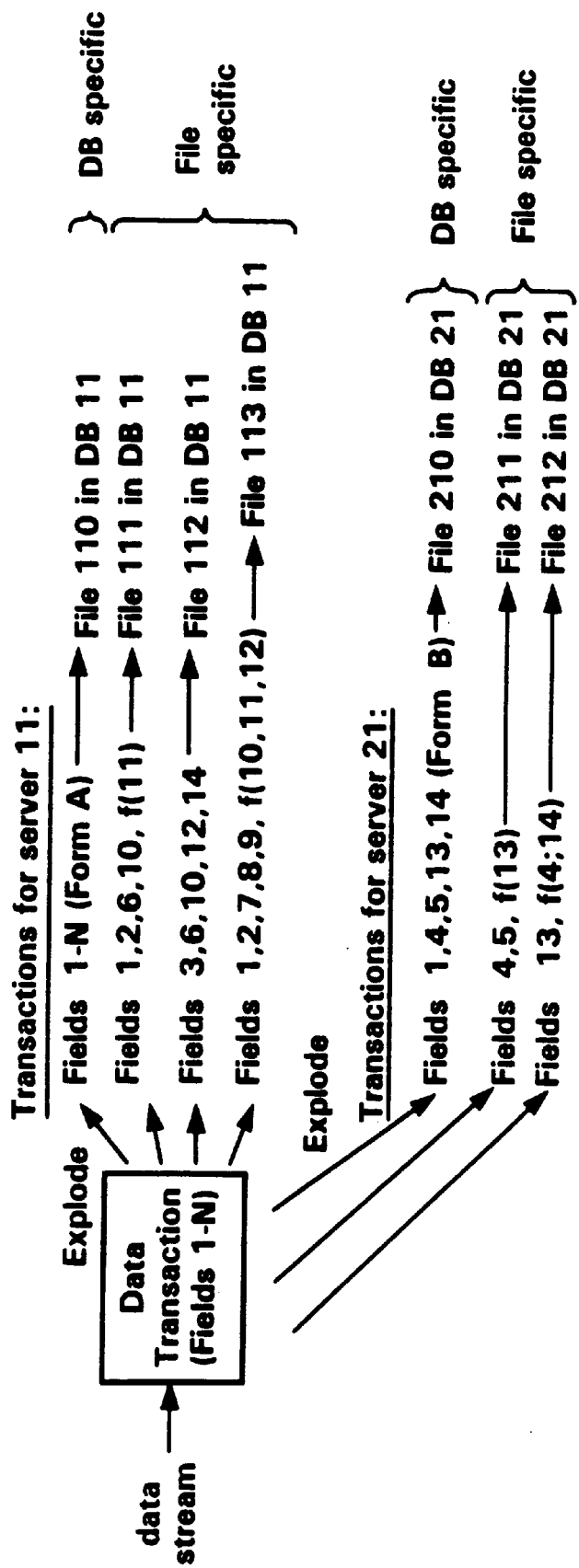
FIG. 3 illustrates an "exploded" data transaction in which the component parts of a data transaction are stored in database-specific and file-specific locations.
Figure 4:
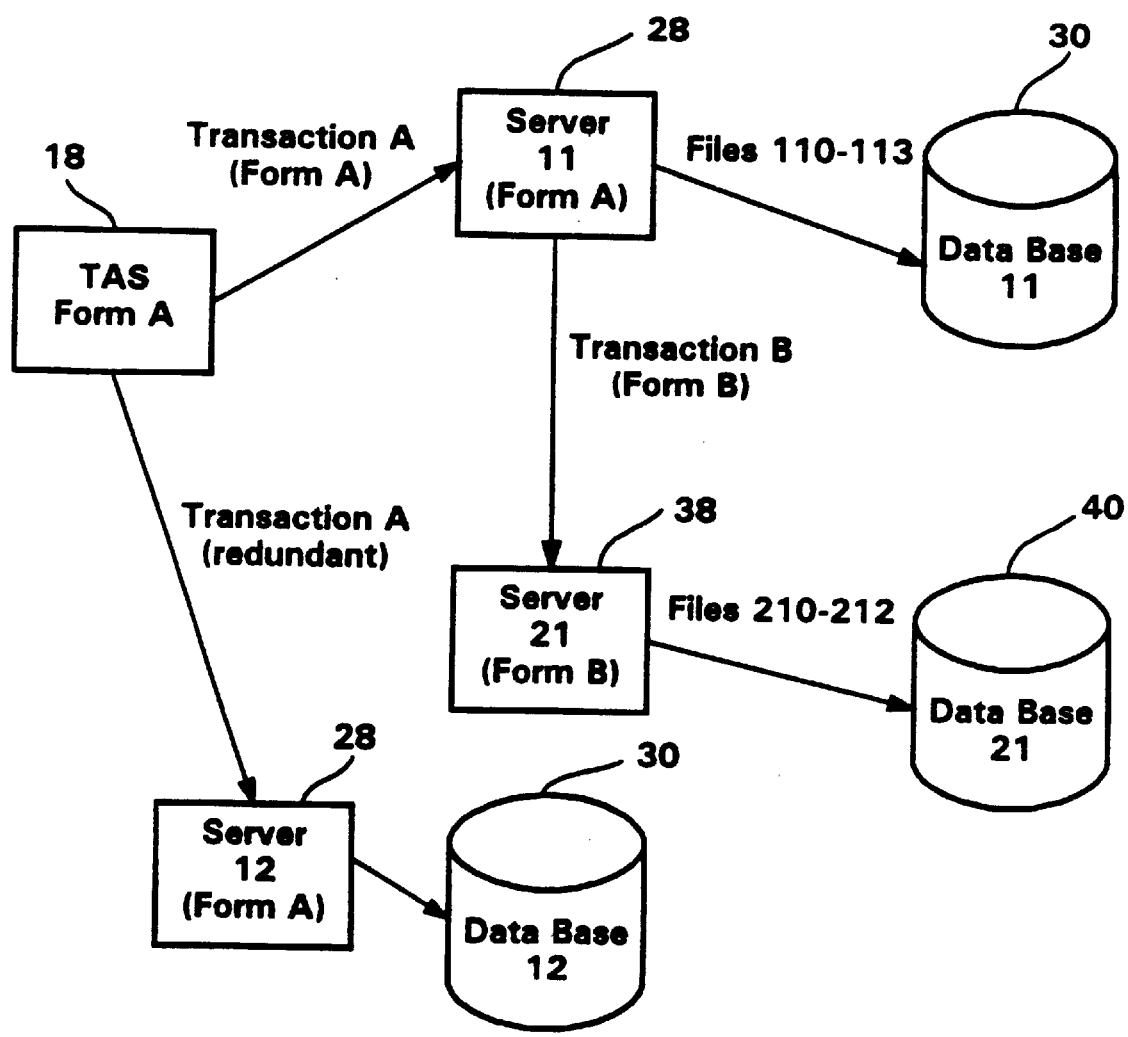
FIG. 4 illustrates the "exploded" transaction of FIG. 3 in the context of the system illustrated in FIG. 1.

FIGS. 3 and 4 illustrate the "explosion" of the stream of data forming the data transaction created using the data transaction form 42 of FIG. 2. As shown in FIG. 3, each data transaction contains data which is specific to a particular database and/or specific to particular files in one or more databases. The data in the data transaction is "exploded" accordingly. For example, the complete data transaction from FIG. 2 (Form A) is stored in a particular file (file 110) of the database 30 associated with the transaction entry device 12 which created the data transaction (database 11 in FIG. 1). Storage of the entire data transaction is desired so that records may be maintained in the event of system error, power failure, and the like. The transaction controller 36 then extracts data from those fields of the data transaction which it knows to be related in forms of that particular type.

For example, the data in fields 1, 2, 6, 10, and a function of the data in field 11 may relate to a particular application stored in file 111 of database 11. Similarly, the data in fields 3, 6, 10, 12, and 14 may be related to an application stored in file 112 of database 11, while the data in fields 1, 2, 7, 8, 9, and a function of the data in fields 10, 11, and 12 may be related to an application stored in file 113 of database 11. These fields are extracted from the received data transaction by transaction controller 36, reconstituted into a file entry of the appropriate format (as necessary), and stored in the associated database 30.

All of the data in the received data transaction, or a subset thereof, may also be retransmitted to one or more additional application specific databases, such as database 21 of the databases 40 in tier 3. As illustrated in FIG. 3, the database specific data of fields 1, 4, 5, 13, and 14, forming the subset (Form B) of the original transaction (Form A), is stored in file 210 of database 21 so that a complete record may be maintained. Subsets of the data in Form B are then stored in specific files of database 21 as indicated. In this manner, the data of the original data transaction (Form A) is automatically sent to all databases which contain files which must be updated by any or all of the data in Form A.

FIG. 4 illustrates the explosion of the data transaction in FIG. 3 for the system 10 illustrated in FIG. 1. As shown, the data in the data transaction (Form A) is extracted to update files 110–113 of database 11 as well as files 210–212 of database 21. A redundant copy of Form A is also maintained in database 12.

As will be explained more fully below, the system of FIGS. 1–4 is significant in that the data in a data transaction may update one or more databases serviced by file servers operating under control of numerous types of operating systems without the requirement of a terminal or operating system emulation by the transaction entry device 12. On the contrary, the transaction entry device 12 of the invention permits data capture and storage with a minimum amount of processing at the transaction entry point (tier 1), which, of course, minimizes system cost.

B. Transaction Entry Device 12 (FIGS. 5–10)

As noted above, the transaction entry device 12 is particularly characterized by the TAS 18, which controls the various operations of the transaction entry device 12 in its transaction entry mode. Preferably, TAS 18 uses simple menu structures and predetermined forms stored as data steams in a flash memory or RAM for facilitating data entry. The menus are treated as a special type of form and are used to call other menus, forms, or processes. The forms, on the other hand, are used to create data transactions which are sent to one or more file servers operating under different operating systems, where the data transaction is "exploded" into its component parts for storage in a unique file structure for updating all records affected by the data in that data transaction. In turn, the "exploded" data transactions may be transmitted to another application specific database (tier 3) for storage. Processes, on the other hand, are selected to perform limited processing of the values in the fields of the forms. Such processing may be performed locally but is preferably performed by the associated database server 28.

1. Hardware

Figure 5A:
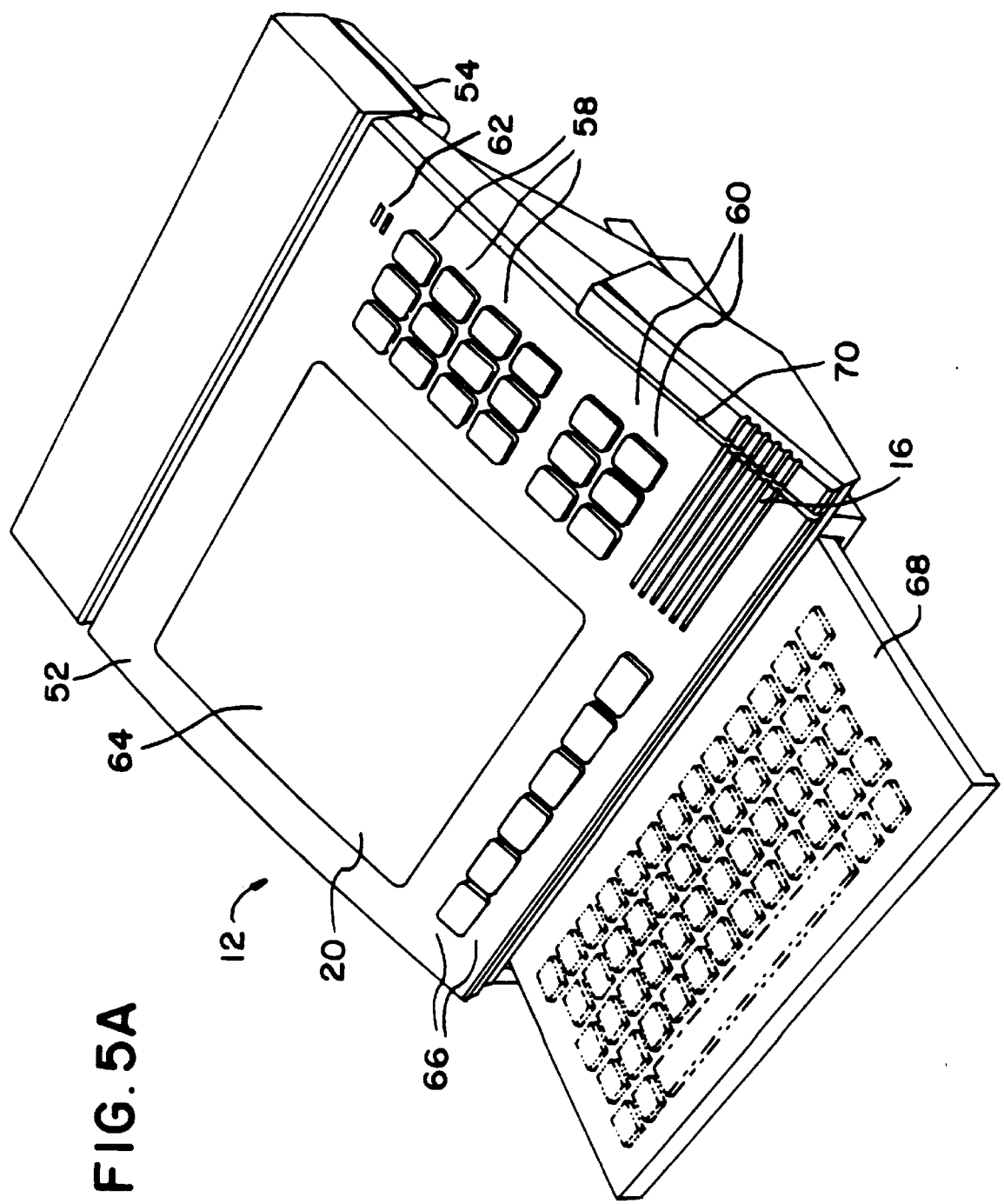
FIGS. 5(*a*) and 5(*b*) together illustrate a preferred embodiment of a transaction entry device in accordance with the invention.
Figure 5B:
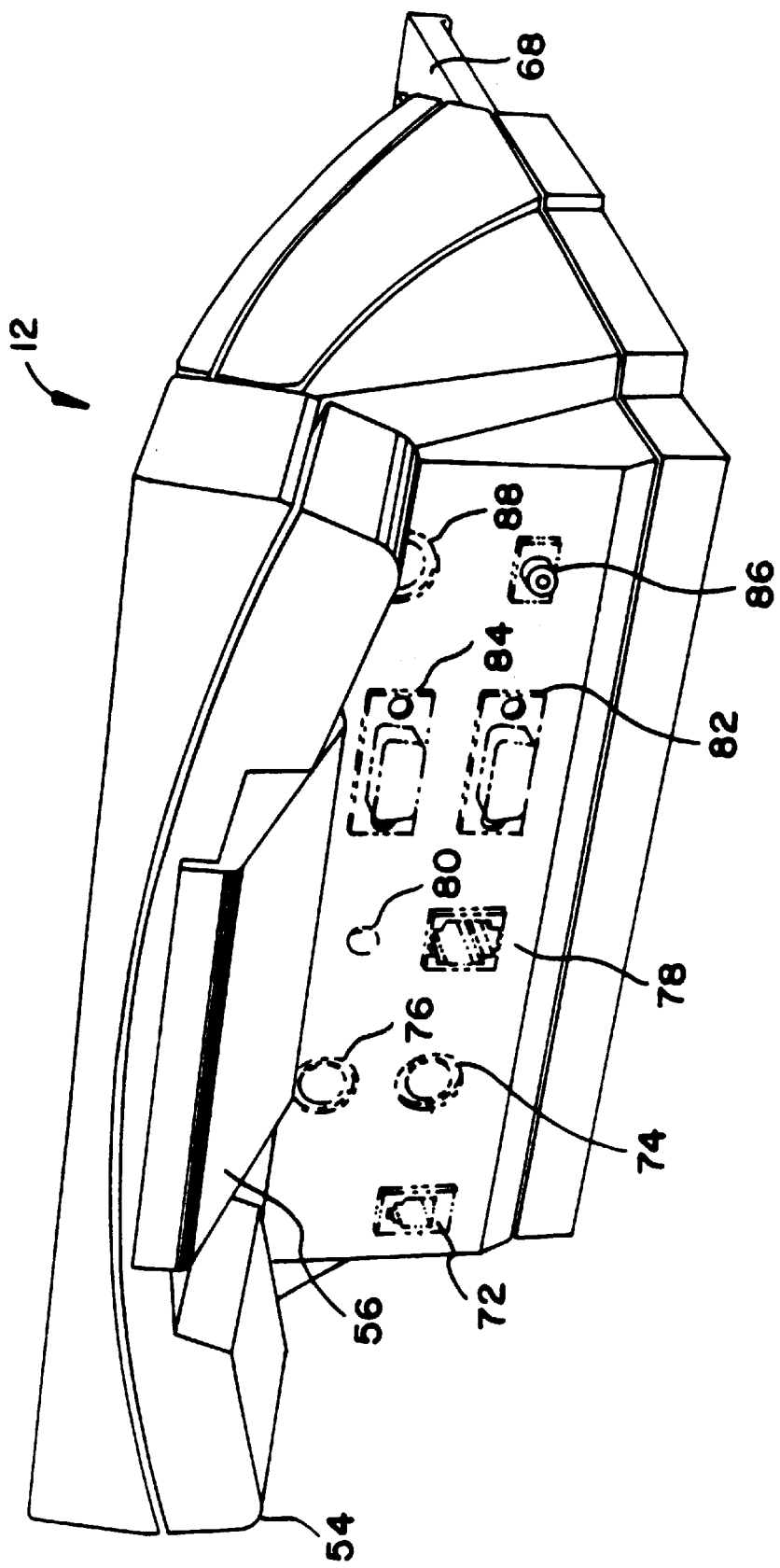
Figure 6:
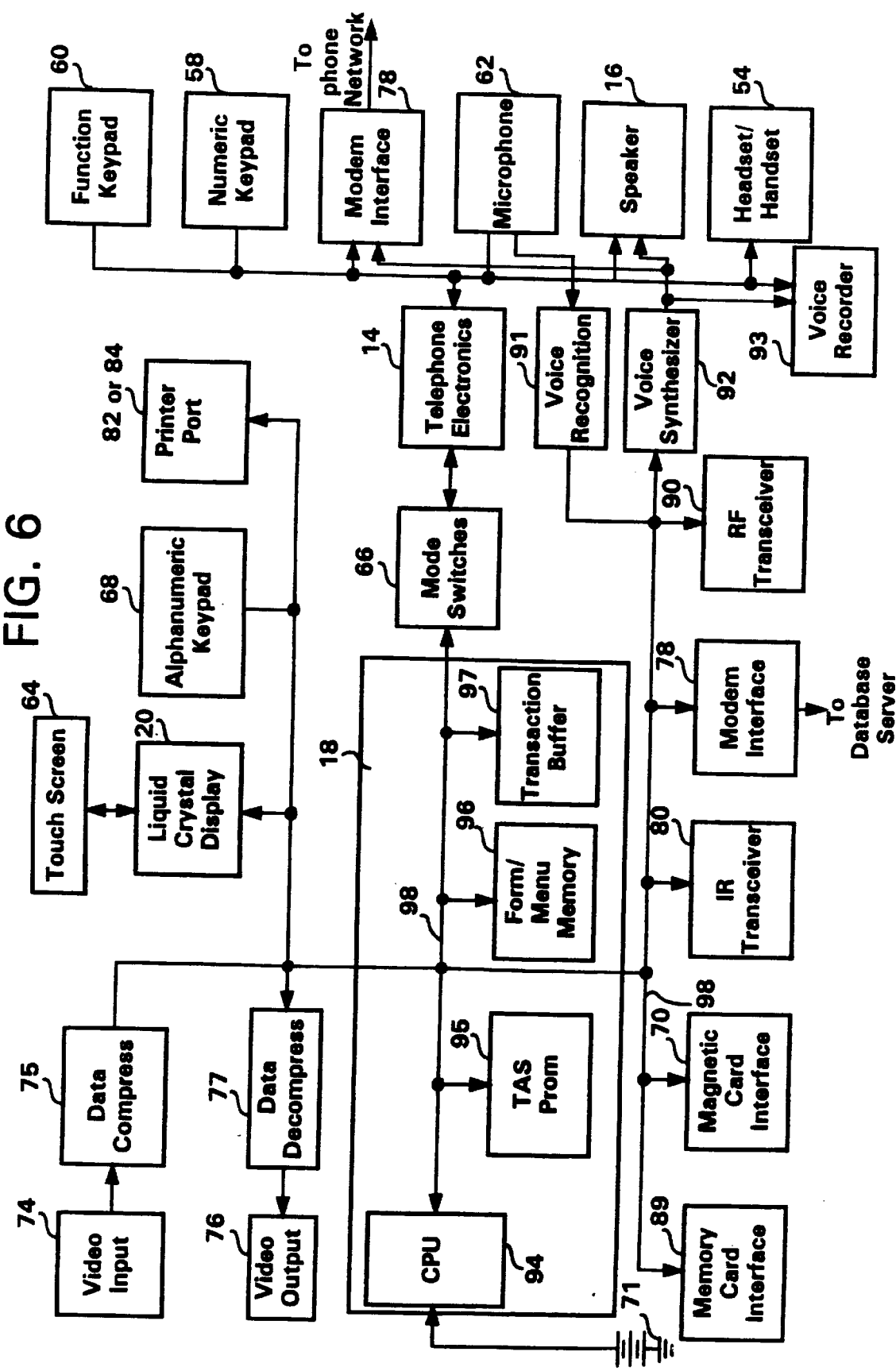
FIG. 6 is a schematic diagram of the electronics of the transaction entry device illustrated in FIGS. 5(*a*) and 5(*b*).

A preferred embodiment of a transaction entry device 12 incorporated into a conventional telephone is illustrated in FIGS. 5 and 6. As shown in FIG. 5a, a preferred desktop embodiment of a transaction entry device 12 includes a housing 52 on the order of 8 inches wide by 12 inches long for housing telephone electronics 14 and the hardware (board and/or a disk, PCMCIA memory card, smart card, CD ROM, or floppy disk reader) of TAS 18. Transaction entry device 12 includes an optional handset (or headset) 54, cradle 56 (FIG. 5b), numeric keypad 58, telephone function/line keys 60, microphone 62, and speaker 16, which facilitate operation of the transaction entry device in the telephone mode. As known to those skilled in the art, telephone functions accessed by telephone function keys 60 may include mute, speaker, line select, conference, hold, transfer, volume control, and the like.

However, the transaction entry device 12 is further characterized by display 20 with touch screen 64, mode switch/computer function keys 66, optional retractable keyboard 68, an optional magnetic card reader 70, a touch tone keypad 58, a voice transceiver 62, and/or a portable mouse (not shown), which facilitate operation of the transaction entry device 12 in the transaction entry mode. A memory (PCMCIA), smart card, CD ROM, or floppy disk reader may also be accessed via a door (not shown) as in a laptop computer. Preferably, display 20 is a super twisted, high contrast, reflective liquid crystal display (LCD) with a minimum of 20 characters per line and 16 lines (preferably, 40 columns by 25 lines), while touch screen 64 is preferably a clear pressure sensitive keyboard made up of 224 keys (16 rows of 14 keys) attached to the face of the LCD. Preferably, the LCD is also available as a backlit unit. Of course, touch screen 64 is not necessary if optional keyboard 68 is provided. In addition, a battery backup 71 (FIG. 6) may also be provided; alternatively, the battery 71 may be the primary power source for a portable (cellular) embodiment of the transaction entry device 12 in accordance with the invention.

FIG. 5b illustrates several of the connections to transaction entry device 12. Typically, transaction entry device 12 includes a handset (headset) jack 72 for connecting optional handset (headset) 54 to telephone electronics 14 when it is desired to communicate more privately than when only microphone 62 and speaker 16 are used. A video input port 74 is also provided for connecting conventional data compression circuitry 75 within the transaction entry device 12 (FIG. 6) to an optional video camera which provides picture phone type video or to a facsimile device or scanner. Such video data may be appended a frame at a time to the end of a data transaction in miscellaneous processing field 50 to create a multimedia data transaction as described above with respect to FIG. 2. A video output port 76 is also provided for providing decompressed video or facsimile data from data decompression circuit 77 (FIG. 6) to a video receiver, a high quality computer monitor, a facsimile device, and the like. Such data may also be provided to printer port 82 or 84 as desired. A multi-line phone jack for a wired modem interface 78 is also provided, although a wireless or cellular modem may also be used. Preferably, modem interface 78 provides separate modem connections for the telephone electronics 14 and the TAS 18, although only a single modem connection is necessary.

An optional infrared or wireless transceiver 80 is further provided for enabling remote control operation of television and stereo equipment and the like in response to data transactions transmitted/received by the transaction entry device 12. Transceiver 80 includes an internal signal generator chip which reads parameters stored in TAS 18 for determining the appropriate transmission frequencies for the infrared or other wireless signals. Control of the devices is then provided through menus on the display 20. Additional transceivers 80 may also be provided on each corner of the housing 52 so that the infrared or other wireless signal will cover more area (each transmitter typically covers about 60° circumference). All such devices are known to those skilled in the art and thus will not be described in detail here. The transceiver 80 may also accept inputs from an infrared mouse (not shown).

A computer interface (RS-232) serial port 82 and parallel port 84 is also provided for transmitting/receiving data to/from another computer device and for providing output to a printer. A power input port 86 and a keyboard input 88 are also provided. Keyboard input 88 accepts a connection from a standard keyboard or a folding type keyboard (not shown) which may be used in addition to, or in place of, retractable keyboard 68. An optional removable PCMCIA memory card interface 89 (FIG. 6) for updating the operating instructions of an internal TAS 18 or for inserting a removable TAS 18 stored on a memory card as well as an optional RF transceiver 90 (FIG. 6) for low power wireless networking to other electronic equipment may also be provided on the transaction entry device 12 as desired.

FIG. 6 is a schematic diagram of the electronics of the transaction entry device illustrated in FIGS. 5(a) and 5(b). Corresponding reference numerals for corresponding elements are used in FIGS. 5(a), 5(b) and 6. As shown in FIG. 6, in addition to the elements described above with respect to FIGS. 5(a) and 5(b), the transaction entry device 12 may include a simple voice recognition circuit 91 which permits voice selection of menu options and the like. In "voice selection" mode, the user would voice "1", "2" or "3" depending on the desired menu selection, and the voice would be picked up by microphone 62 on the housing 52 of the transaction entry device 12 and recognized by voice recognition circuitry 91. The proper selection signal would then be sent to the TAS 18. Similarly, the TAS 18 may provide audible output using a conventional voice synthesizer 92, which provides the audio output to the user via speaker 16 and to a caller via modem interface/telephone line connection 78. The voice synthesizer 92 may, for example, allow certain data transactions to be audibilized for a blind person who cannot make selections from a conventional video display. In addition, a voice recorder 93 may also be provided to record portions of telephone calls, portions of voiced data transactions, or a caller's message as when using a conventional digital answering machine. On the other hand, voice recorder 93 may be provided in database server 28 for use in storing/forwarding audible messages to the database 30.

As noted above, the transaction entry device 12 is characterized by TAS 18, which controls the creation of data transactions in the transaction entry mode. As shown in FIG. 6, TAS 18 is implemented in hardware by a conventional microprocessor 94, such as an Intel 80386SX (20 MHZ or higher) or equivalent, a TAS PROM 95, a form/menu memory 96, and a transaction buffer (RAM) 97. In a preferred embodiment in which TAS 18 is located on an internal PC board of the data transaction device 12, TAS PROM 95 is a flash PROM which holds 500 kB or more of control data (firmware) for the microprocessor 94 (such as the microcode for the algorithms of FIGS. 7–10 below), while form/menu memory 96 is a flash memory or a RAM which holds 1 MB or more of data transaction menus and forms. Transaction buffer 97, on the other hand, is preferably inexpensive RAM which only needs to be as large as the largest data transaction, and may hold, for example, 128 kB or more of transaction data including application and operating system variables. Preferably, TAS PROM 95 and form/menu memory 96 are updated by downloading data streams containing new instructions and/or forms and menus over a conventional data bus 98 via modem 78, magnetic card interface 70, or via a removable memory card read by memory card interface 89 as necessary. Alternatively, additional memory elements may be added as additional applications are added to transaction entry device 12. On the other hand, TAS 18 may be implemented on a PCMCIA card or equivalent for insertion into the transaction entry device 12 or a personal computer for implementing the form driven operating system of the invention. For example, TAS PROM 95, form/menu memory 96, data transaction buffer 97 and, optionally, microprocessor 94 may be located on a removable memory card inserted into memory card interface 89 to access data bus 98.

Transaction buffer 97 may also be expanded to handle transactions of any size or type, including multimedia applications in which video and/or audio data is appended to data transactions. Also, transaction buffer 97 may be sized to permit batch transmission and storage of the data transactions.

Those skilled in the art will appreciate that the transaction entry device 12 may be docked into a docking station of a network. RF transceiver 90 may be used for low power wireless communications in such an environment. In addition, those skilled in the art will appreciate that the transaction entry device 12 may be implemented as a battery operated portable device which is a cross between a laptop computer and a cellular telephone of the type illustrated by Paajanen et al. in U.S. Pat. No. 5,189,632, for example. In such an embodiment, an optional headpiece could be provided, as well as a microphone and speaker arrangement in the flip-top. Of course, the liquid crystal display screen 20 would typically be reduced in size to, for example, 40 columns by 12 rows, and the touch screen 64 may be eliminated. However, most of the other options of the embodiment of FIGS. 5a and 5b would preferably remain so that the portable unit could also be used at a desk as desired. The electronics of the transaction entry device 12 would otherwise be as illustrated in FIG. 6 except for certain size and shape considerations well within the skill of those skilled in the art.

2. Software

As will be apparent from the following description, TAS 18 does not utilize a conventional operating system to control the processing of application software. On the contrary, TAS PROM 95 stores simple firmware algorithms (FIGS. 7–10) operating in a kernel fashion for navigating a user through menus and forms provided from form/menu memory 96 for particular applications, and it is the resulting data streams which control the microprocessor 94 at any point in time. In other words, the data streams from the TAS PROM 95 and the data streams from the form/menu memory 96 together reconfigure microprocessor 94 into a special purpose processor for each application specified by the forms. The microcode of the TAS PROM 95 and the parameter streams from the form/menu memory 96 thus operate together as a simple form driven operating system for microprocessor 94 for all applications and is the sole code used to control microprocessor 94 for any and all applications (i.e., no conventional application programs and no full-scale operating system such as DOS™ or Windows™ needs to be provided). As a result, the microprocessor 94 may be reconfigured into a new special purpose computer with each new form read from form/menu memory 96, and such forms/menus may be added at any time by reading in the appropriate data streams from a memory card or from an external database server 28 or by adding additional memory. A specific implementation of the TAS firmware stored in TAS PROM 95 will be described below with respect to FIGS. 7–10. Different system embodiments, such as implementation of TAS 18 in a personal computer and other configurations, will then be described below with respect to FIGS. 11–15.

The TAS PROM 95 contains control data (firmware) processed by microprocessor 94 for generating a template for a data transaction from a data stream stored in form/menu memory 96 (or received directly from a memory card or external database server). The generated template and the data input by a user or retrieved from an external database or magnetic card, smart card, memory card, CD ROM, floppy disk, and the like, together constitute a data transaction. The TAS firmware and the selected template together control the behavior of the microprocessor 94 by logically defining a table of menu options and/or database interfaces which are navigated through by the user. As noted above, the user navigates through a series of menu selections by selecting another menu, a form, or a process. Once the data transaction for a desired application is completed (the fields have received data input from the user), the data transaction is transmitted (alone, or in a batch of data transaction) to a database server 28 for "explosion" into all of its component parts for storage. In this form, the TAS firmware from TAS PROM 95 and menus and forms from form/menu memory 96 of the invention together replace a conventional operating system and individual application programs. Indeed, the invention permits the transaction entry device 12 to be completely operating system independent and to be completely reconfigurable for different applications by simply changing the forms and menus read by the microprocessor 94.

The TAS 18 of the invention is connected via a predetermined protocol stored as instructions within TAS PROM 95 to a database server 28 and its associated database 30. As noted above, the database server 28 associated with a particular transaction entry device 12 operates as a repository of the data transactions created by the transaction entry device 12 and as a supplier of data to the transaction entry device 12 for completing the forms and providing additional forms, menus, processes, and the like. Since the system of the invention is operating system independent, there are no hardware or software limitations on the characteristics of the database server 28. On the other hand, the database server 28 may be the server of a bank, a hospital, or some other entity for which a transaction is desired. Forms and menus unique to that database server 28 may be downloaded to TAS 18 and used to reconfigure the transaction entry device 12 to permit the entry of data in a format understood by the database server 28. This approach is distinct from prior art approaches which require the downloading of software which would require the transaction entry device 12 to "emulate" the input requirements of the database server's operating system software.

The parameter set making up the individual forms are typically provided by database server 28 as a stream of data via cellular, wired or wireless modem and stored in form/menu memory 96, while any downloaded instructions are stored in TAS PROM 95. Linkage between TAS 18 and its database server 28 is preferably provided via a dictionary program specific to each database server 28. This dictionary program knows the characteristics of each field of each form for each data transaction and is used by the database server 28 to "explode" the received data transactions into their component parts.

Preferably, at power on, TAS 18 automatically prompts the user with a "Download Parameter Streams" command so that the user can load into form/menu memory (flash memory) 96 from an external source the desired streams of menu and form data for the desired application. The "download parameter" process will then be initiated by dialing the external database server 28 initiating the connection via the modem interface 78. Once connected, the transaction controller 36 of database server 28 will transmit the requested parameter stream. The TAS 18 will load the received data stream into form/menu memory 96, and, upon completion, the prompt "Executive Menu Ready" will be presented on the display screen 20. The executive menu then will be automatically presented to the user for selection of the desired menu, form, or process. Of course, the form/menu data may be similarly downloaded from a smart card or memory card via memory card interface 89, from a magnetic card via magnetic card interface 70, even from a CD ROM or floppy disk interface (not shown).

Upon initiation of the transaction entry mode by the user, TAS 18 calls a set of panel parameters from form/menu memory 96 and paints a form onto display screen 20. These forms are either menus for navigating to particular forms or a form into which data is entered by the user. As will be explained below, the menus provide functionality through simple menu selection. The form on the display screen 20 is completed by the user by entering the appropriate data using touch screen 64 or optional keyboard 68. Alternatively, the requested data may be read in from a memory card or smart card via memory card (PCMCIA) interface 89, from a magnetic strip on a swipe card via magnetic card interface 70, from a CD ROM or floppy disk, or provided as voice input via voice recognition circuit 91. In addition, a query data transaction may be sent to the database server 28 associated with the transaction entry device 12 for data needed to populate certain fields in the present form. The type of data entry is requested from a subset of options presented to the user upon pressing a "?" key or a "Request for More Information" button. This request will give the user several options to choose from, such as data entry using keyboard 68, touch screen 64, swipe card via magnetic card interface 70, memory card via memory card (PCMCIA) interface 89, by voice annunciation of the number of the item in the menu via voice recognition circuit 91, or via modem from a database 30. Hence, the data transaction created by the TAS 18 may or may not make use of stored data for reducing the amount of data entry required of the user.

When a data entry option is selected, TAS 18 does one of the following: another set of parameters is called up and another form is painted, the correctness of the selection is verified and a set of options for selections is presented based on interactions with stored data, the completed data transaction is transferred via cellular, wired or wireless modem to database server 28 for storage in database 30, or data values are requested from database 30 for incorporation within the transaction buffer 97. In a preferred embodiment, selections from the menu are made by touching the appropriate place on the menu using touch screen 64; by voice annunciation of the number of the menu item via microphone 62 and voice recognition circuit 91; by using one of the computer function keys 66 to run a cursor up the menu, another key to run the cursor down the menu, and a third key to make a selection in a conventional manner; by using keyboard 68 as a selection device; or by using a mouse input (not shown) to control the cursor. When the keyboard 68 is used, the keyboard keys may be used to control a cursor, with the "enter" key being used for making a selection; alternatively, the number of the item selected may be entered and the "enter" key pressed to make the selection. Once the selection is made, the appropriate form is extracted from form/menu memory 96 as a stream of data. Alternatively, in addition to presenting a menu for selection of or completion of a form, the TAS 18 can also present a menu selection for initiating a process such as calculation of an interest rate using one or more fields in the form, the finding of a mean, the finding of a name, or searching for entries for a particular date. This processing can be performed locally or at the remote database server 28. Alternatively, TAS 18 can present a menu selection for setting up the search criteria for a browser on the Internet and then transmit the search criteria to the browser. These processes may be stored in TAS PROM 95, form/menu memory 96, in an off-line server where they are initiated, or any other place where they may be downloaded to the operating portion of the transaction entry device 12. In a preferred embodiment, processes are generally initiated in the database server 28 by sending a data request to the database server 28, processing the data in the database server 28, and then returning the answer as a data stream or report back to the transaction entry device 12.

A process typically initiates a data string which calls a process on an external machine. For example, the transaction entry device 12 may be used to download and store control signals for control of various devices using transceiver 80 (FIGS. 5 and 6). The form of the control signals will depend upon the signal storage in an optional infrared or wireless chip, which can be loaded by the TAS 18 or by an off-line device via cellular, wired or wireless modem or through the air using RF transceiver 90 for low power direct digital transfer in wireless form. In addition, in the case where the transaction entry device 12 is used in a medical office, for example, the process may be used to transmit a prescription to a pharmacy or mail order house using prestored modem numbers or may enable the physician to call up a list of phone calls to make for the day or a list of the follow-up appointments for a particular date. In other words, the TAS firmware can also "explode" the data transaction into all of its ancillary parts for transmission to numerous records in one or more databases without assistance of database server 28.

A preferred embodiment of the TAS firmware will now be described with respect to FIGS. 7–10.

Figure 7:
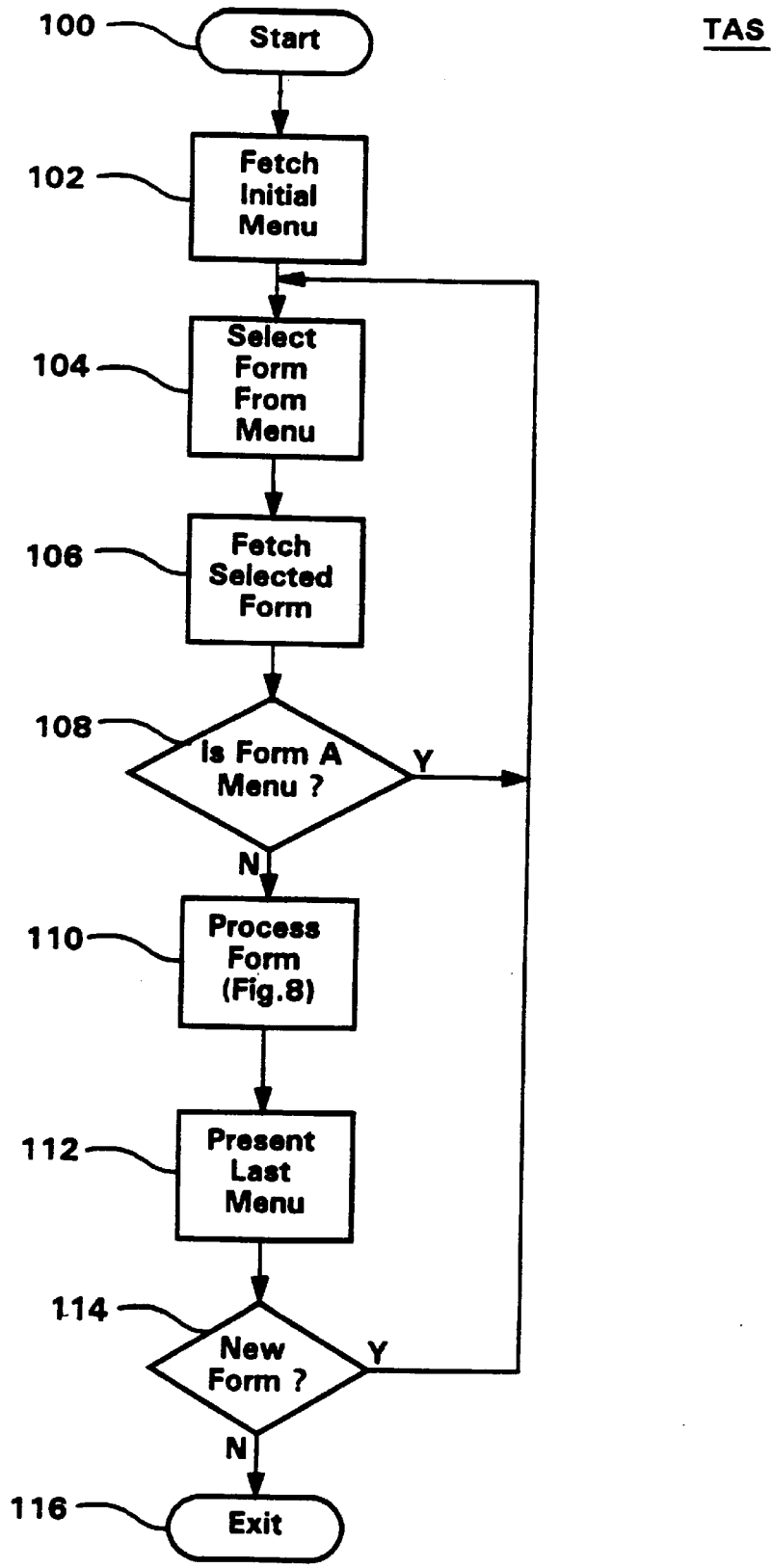
FIG. 7 is a flow diagram of a menu driven transaction assembly (application) server (TAS) in accordance with the invention.

As noted above, the transaction assembly (application) server (TAS) 18 is a data stream stored in TAS PROM 95 which together with the forms from form/menu memory 96 create a simple form driven operating system which provides the necessary control data (firmware) to microprocessor 94 so that no conventional operating system is necessary. FIG. 7 is a flow diagram of a menu driven TAS 18 in accordance with a preferred embodiment of the invention. As illustrated, the TAS firmware starts at step 100 and fetches an initial menu from form/menu memory 96 at step 102. The initial menu is prompted within a few seconds of booting the TAS firmware after the system logo. The initial menu typically presents the options of downloading a parameter stream from the database server 28 for enabling additional functions (described above) or printing an executive menu. If the executive menu is selected, the executive menu is retrieved from form/menu memory 96. The executive menu contains numerous application options to the user, namely, selection of a form, another menu, a process, or an automatic switch to telephone mode, one of which is selected at step 104. The data streams in form/menu memory 96 may be distinguished as to type (form, menu, or process) by appending a code such as "F" for form, "M" for menu, and "P" for process, and as to number by appending a form, menu, or process number at the beginning of the following data stream. These codes are recognized by the TAS firmware, and TAS 18 acts accordingly.

If the option selected at step 104 is a form, the proper form (data stream for form $F_{xy}$) is fetched from form/menu memory 96 at step 106, a transaction buffer 97 equal in length to the size of the record associated with the form $F_{xy}$ is formed in RAM as transaction buffer 97, the form is stored in the transaction buffer 97, and a connection is made to the appropriate database server(s) 28, although the connection may be made later after a batch of data transactions are completed. The data stream for the selected form will consist of prompts, print locations for the prompt, data entry points, print locations for the data entry start, data entry length, and a code as to the nature of the data entry. This code can be numeric, alphanumeric, a cross-reference to stored data or previously entered data, a formula for the creation internally to TAS 18 of the result from previously entered data, or an external request for data, help, or reformulated values. The data stream entered into the fields of the form will not only indicate the location for the printing of the prompt and the field for data entry, but also the size of the field and the storage, a start point within the transaction buffer 97 for the stored element, and the type of data: alphanumeric, numeric (floating point or integer), date/time, and the like.

On the other hand, if it is determined at step 108 that the selected option is a menu ($M_{xy}$), a hidden set of codes pointing to the form $F_{xy}$ that the selection will lead to is read, and control branches back to step 104 for selection of another menu or form. When a menu is chosen, each item has its sequential number, its descriptor, and a code for what it will "call" (another menu, form, or process). In other words, each choice has associated with it a series of item codes which branch out to another form, menu, or series of tests upon the data entered. A menu also has a numeric code for each of the storage areas and a special code including a security code for certain menu items, process codes of forms within the menu, or a pointer to the process code. A pointer may also be provided in the menu for processes to be performed off-line (i.e., in an associated database server 28).

If a process ($P_{xy}$) is selected at step 104, the database server 28 is notified that something is requested from its database 30 or that some processing of data is requested. For example, the TAS 18 may send an inquiry data transaction to the database server 28 so that options may be returned to the TAS 18 for presentation to the user for selection. The process triggers an external process of database server 30 with a parameter stream, and control is either returned to the TAS 18 or control is held up until the process is complete, in which case a message is sent back to the TAS 18. This message can be a report, selected data, a value resulting from a calculation, and the like. Processing such as checking detectors and the like may also be performed locally by TAS 18. On the other hand, if the TAS 18 is implemented on a personal computer, much of the processing may be handled locally by the personal computer's microprocessor.

Figure 8:
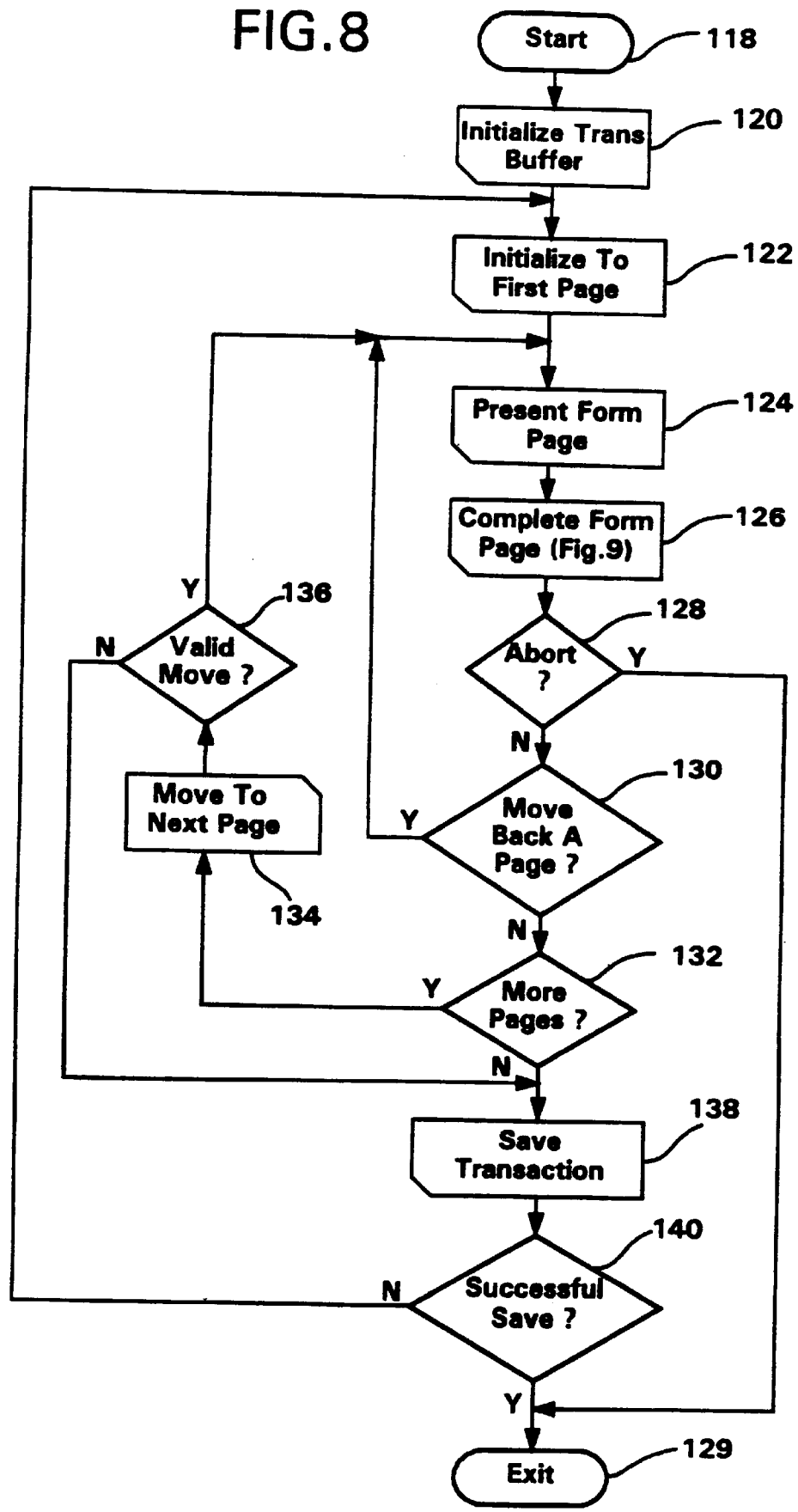
FIG. 8 is a flow diagram illustrating a technique for processing a form used to create a data transaction in accordance with the invention.
Figure 9A:
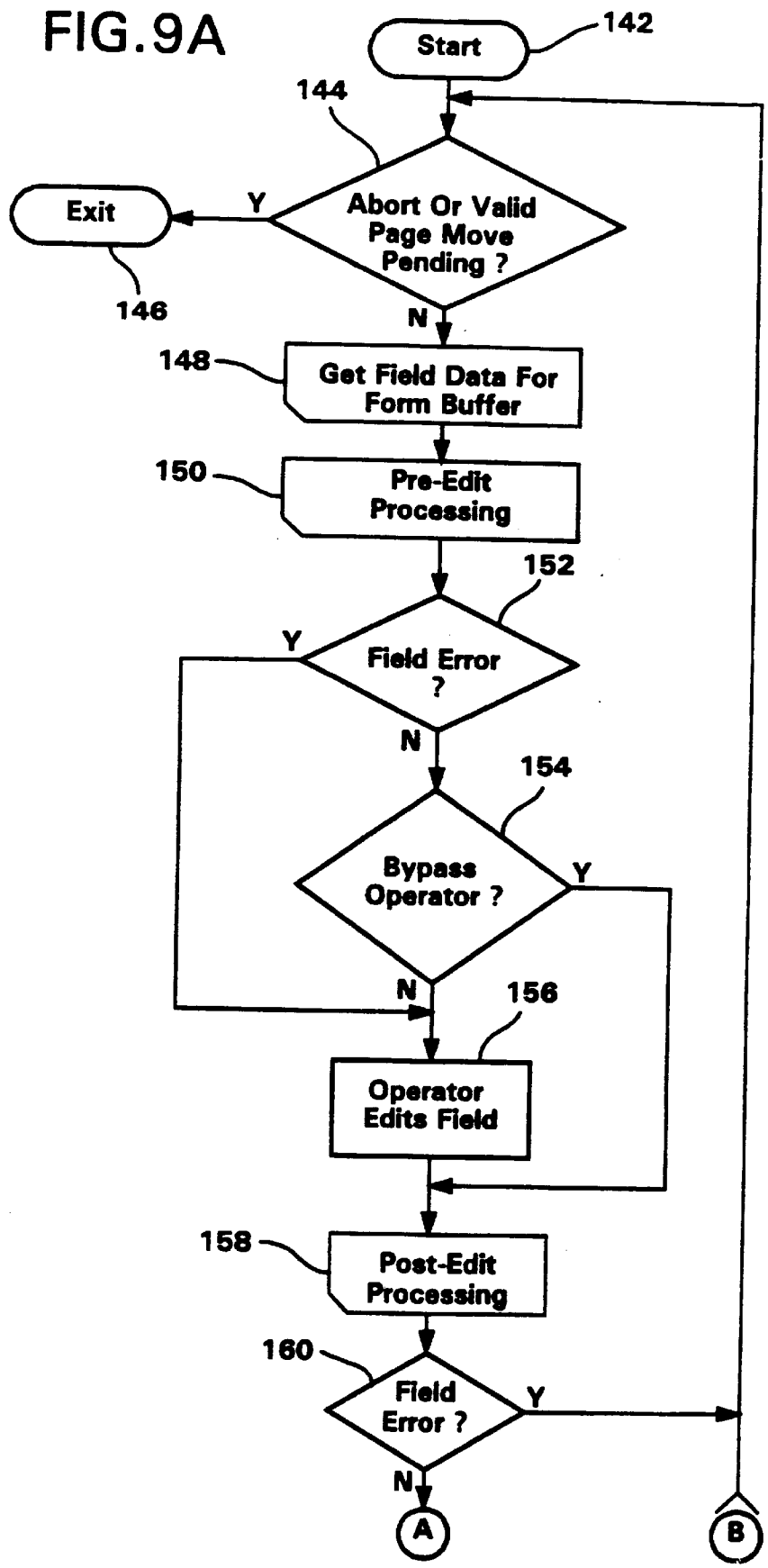
FIGS. 9(*a*)–9(*c*) together illustrate a flow diagram of a technique for completing and editing a data transaction in accordance with the invention.
Figure 9B:
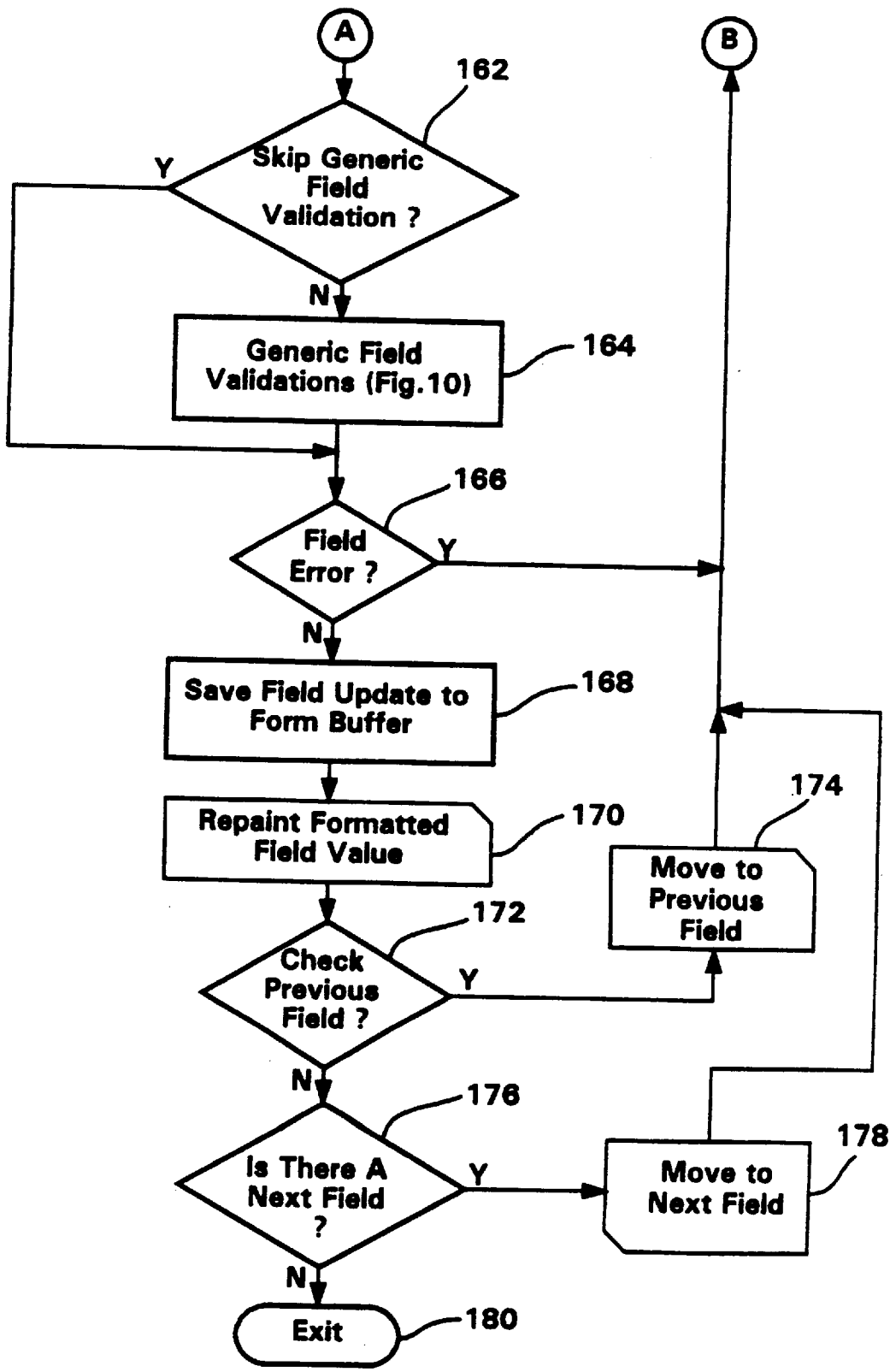
Figure 9C:
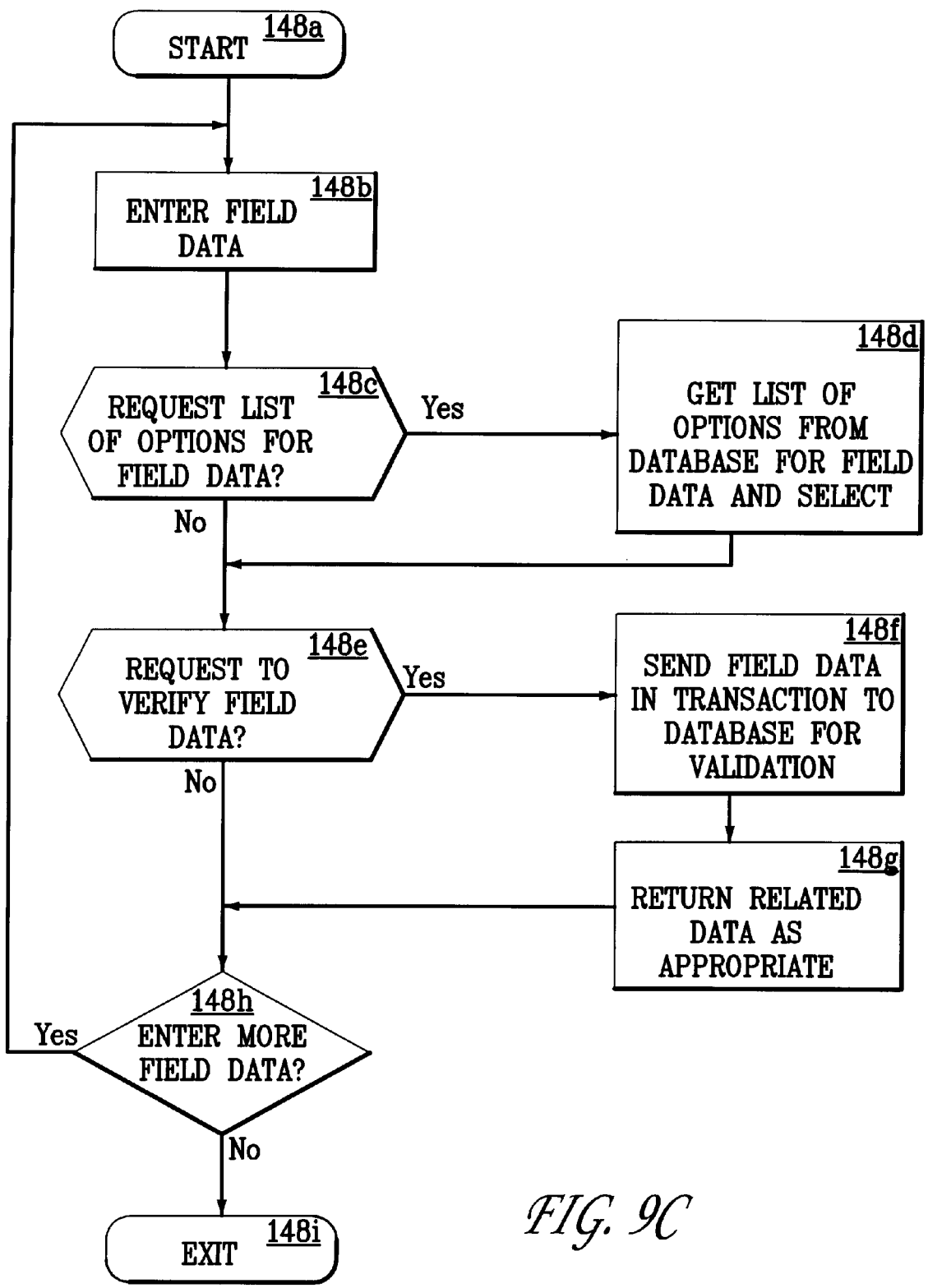
Figure 10:
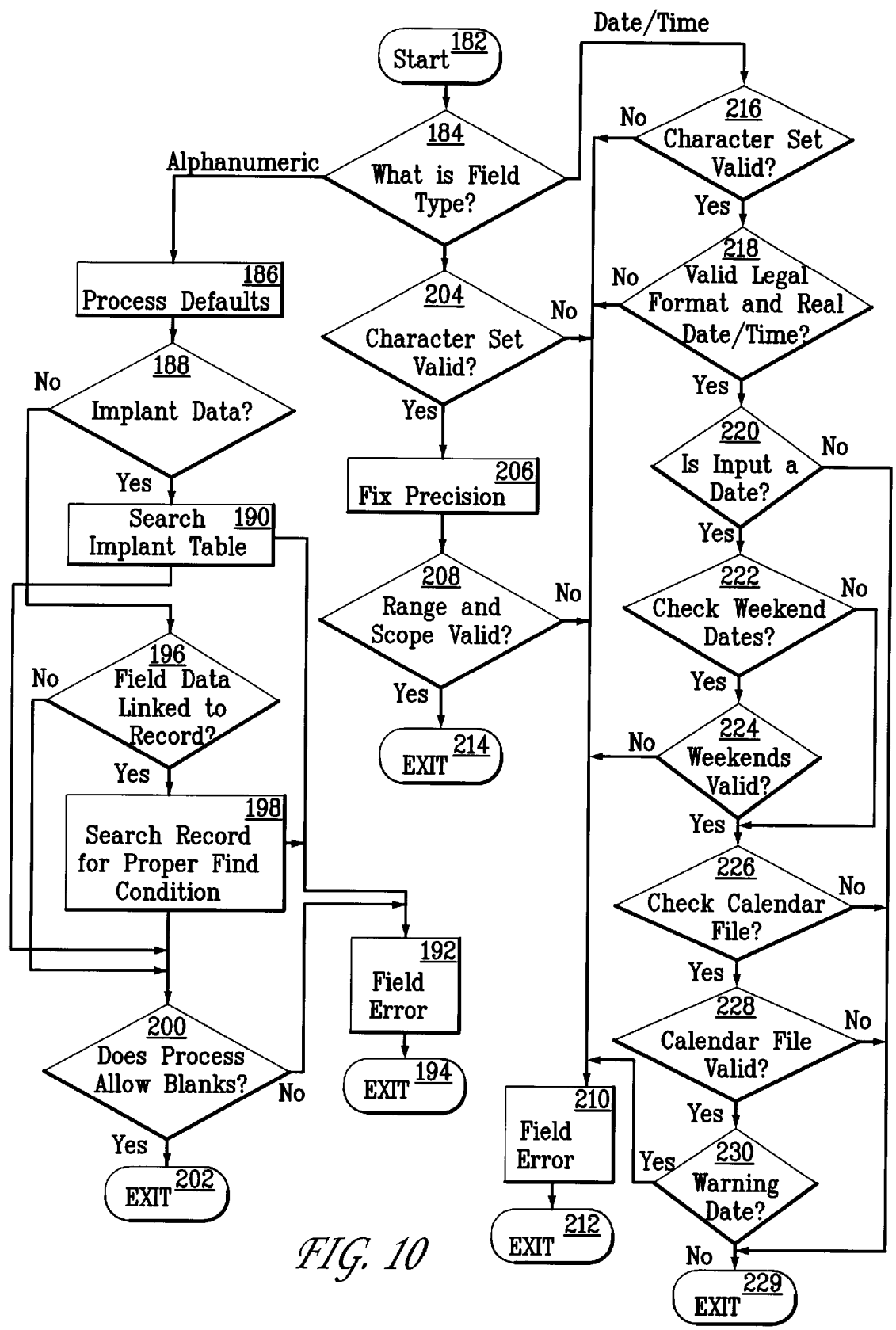
FIG. 10 is a flow diagram illustrating how the TAS validates the fields of each data transaction.

Once the desired form is selected for the user's application, the form is processed at step 110 in accordance with the steps outlined in FIGS. 8–10. As an entry is made in each field, it is automatically stored within the input buffer area of the transaction buffer 97 at its assigned location and in the dictated format. At any time, the entire form may be exited with automatic return to the menu which called it or the form can be cleared for data reentry. Once the form has been processed and transmitted to the appropriate database server(s) 28, the database server connection is terminated and the user is presented at step 112 with the last menu from which the user made his or her selection. Alternatively, the executive menu will be called up as a default menu.

If the user indicates at step 114 that he or she wishes to continue to complete a new form, control branches back to step 104 for menu selection and a new database server connection is made as appropriate. This process is repeated for each form. When no further selections are desired, the TAS firmware is exited at step 116.

FIG. 8 is a flow diagram illustrating a technique for processing a form (step 110) to create a data transaction in accordance with the invention. As illustrated, the process of FIG. 8 starts at step 118 and initializes a transaction buffer 97 at step 120 for storage of the data transaction as it is being created. In other words, if there is a form for the requested application, it is moved from form/menu memory 96 to the transaction buffer 97. If the requested form is not present in form/menu memory 96, an error message may be sent or a request may be sent to database server 28 to download a data stream containing the parameters for the requested form. Preferably, transaction buffer 97 is at least as large as the largest data transaction and serves as an assembly area for the data transaction. Preferably, read and write buffers are formed so that transmit and receive buffers to/from modem interface 78 are available. Of course, transaction buffer 97 may be made larger for this purpose.

Once the transaction buffer 97 is initialized at step 120, the display screen 20 is cleared and the selected form is initialized to its first page at step 122. The first page of the form is then presented to the display screen 20 at step 124. At step 126, the user completes the form page on a field by field basis using any of the data entry techniques described above and the field controls of FIGS. 9 and 10.

The transaction buffer 97 collects the data associated with the form presented to the user on display screen 20 and contains appropriate locations for each separate data element. Upon completion of the data transaction, the contents of the transaction buffer 97 are transferred to the appropriate database server(s) 28 via cellular, wired or wireless modem or via low power RF wireless transmission, preceded by a set of codes (field 44, FIG. 2) which identify the type of data transaction and followed by a string of process identifiers for the database server(s) 28 to use in its programs in creating additional transactions and in storing the data and all ancillary data transactions in the regular file format of the database 30 associated with the database server(s) 28. As a result, the data transaction created in the transaction buffer 97 may have a one-to-many relationship to the data stored in the database 30. Alternatively, a batch of data transactions may be collected and sent in a batch for processing by one or more external servers.

If the user decides to abort the processing of a form at any time (step 128), the form processing routine is exited at step 129. Otherwise, it is determined at step 130 whether the user wishes to go back a page (for a multi-page form) to correct a data entry. If so, control returns to step 124 for presentation of the earlier page. If the user does not wish to examine or edit a previous page, it is determined at step 132 whether the current form has another page which has not been displayed for completion by the user. If the form has more pages, the routine moves to the next page at step 134, and it is determined at step 136 whether the move to the next page was successful. If so, control returns to step 124 for presentation of the next page. Of course, the process of calling a subsequent page in a form or another form upon completion of a form can be dependent upon an automatic call of that page or form sequence or the ability to jump sequence (i.e., skip pages) depending upon a value in any one field that has been entered. In any event, if there are no more pages in the form or if the move to the next page was not successful, the end of the form is marked with a code and the transaction is saved at step 138 by transmitting the data transaction to the appropriate database server(s) 28 for storage in its associated database 30 and/or for "explosion" for storage of data in other databases 40. If it is determined at step 140 that the save was not successful because of a modem error and the like, control returns to step 138 and an additional attempt is made to save the data transaction. Once the data transaction is successfully saved, the form processing routine is exited at step 129 and the last menu used is presented (step 112).

Optionally, stored procedures within any data transaction form (field 50, FIG. 2) are executed at the appropriate time within the flow of the form processing routine before it is exited. However, these processes may be deferred and performed by the database server 28 if needed.

FIGS. 9(*a*) and 9(*b*) together illustrate a flow diagram of a technique for completing and editing the fields of a form (step 126 of FIG. 8). The field completion routine starts at step 142 and first determines at step 144 whether an abort or a valid page move request is pending. If so, the field completion routine is exited at step 146. However, if no abort or page move request is pending, the field data for the first field of the transaction buffer 97 is entered at step 148. As noted above, this field data may be entered via keyboard 68 or touch screen 64, swiped in via magnetic card interface 70, read in from a memory card via memory card interface 89, or designated by voice entry.

On the other hand, as shown in FIG. 9(*c*), obtaining the field data at step 148 may include the further steps of accessing the database server 28 or some other database server to obtain or validate the field data. In particular, starting at step 148*a*, the field data may be inputted by the user at step 148*b*. If the user does not have a complete answer (field data) to provide in response to one or more of the prompts in the form, the user may request at step 148*c* a list of options for the field data in response to the current prompt or series of prompts. In this case, a cellular, wired or wireless modem connection is made at step 148*d* to database server 28 or some other database server for a list of the available data options for the present field or fields. The user then selects at step 148*d* the desired data to populate the present field or fields. At step 148*e* the user may also ask to verify the field data which the user entered in the present field. In this case, the field data entered by the user is included in a data transaction which is sent to the database server 28 or some other database server for verification at step 148*f*. A data transaction including the validated data is then returned to the data entry device 12. In addition, related data may also be returned at step 148*g*. For example, if the data sent for validation at step 148*e* is zip code data, at step 148*g* the corresponding city name may be returned. It is then determined at step 148*h* if the user wishes to enter additional field data in the present field. If so, control returns to step 148*b*. Otherwise, the present field is complete and the field data gathering step is exited at step 148*i*.

Pre-edit processing of the field data is next performed at step 150. Such pre-edit processing may include, for example, setting default values, performing calculations, establishing links to data in other files, looking up and writing data to files already linked to the present form, spawning another form, performing special updates of the display screen 20, hiding fields from view by the user, and the like. Such pre-edit processing may also be used to determine whether modifications or actions in the present field may invalidate an entry in another interrelated field. If so, appropriate measures are taken to update all affected fields or to prevent such problems by setting appropriate default values.

The field completion routine then checks for field errors at step 152 on the basis of the default values and the like set at step 150. If there is no field error at step 152, it is determined at step 154 whether the operator will be permitted to edit the field in the absence of a field error. If so, or if a field error was found at step 152, the operator edits the field at step 156. If the operator editing is bypassed, control proceeds directly to post-edit processing at step 158, which performs essentially the same functions as pre-edit processing step 150 except that the data may be specially validated. The field is then checked yet again at step 160 for a field error. If a field error is found at step 160, control returns to step 144 for reentry of data in the present field or exiting, as appropriate.

If no field error is found at step 160, it is determined at step 162 whether the generic field validation routine of step 164 (FIG. 10) is to be skipped. If so, control proceeds to step 166, where the field is once again checked for a field error. However, if generic field validations are desired, control passes to the routine of step 164 (FIG. 10). If no field error is found at step 166, the field is saved to the transaction buffer 97 at step 168 and the updated field value is painted on the display screen 20 at step 170. If the user then desires to check a previous field at step 172, control passes to a previous field at step 174 and the field completion routine is repeated for the previous field. However, if no previous field is to be checked and if it is determined at step 176 that a further field is present, control passes to the next field at step 178 and the field completion routine is repeated for the next field. This process repeats until the last field is completed and the routine exits at step 180. Control then returns to FIG. 8 for processing a different page of the form.

Each form may be processed in one or more modes. In the input mode, described above, the data transaction is created and transmitted to the database server 28. However, in edit mode, upon entering the ID of a particular record, that record is read from an external database 30 or 40 into transaction buffer 97 for editing. Preferably, a record of the edits is maintained to provide an audit trail. In view mode, upon entering the ID of a particular record, that record is similarly read from an external database 30 or 40 into transaction buffer 97 but for display only. Finally, in delete mode, an entire record can be deleted from the database 30 or 40 if the user has proper security clearance. For each mode, appropriate inquiry data transactions are sent to the database server 28 or 38 of database 30 or 40.

FIG. 10 illustrates how the TAS firmware in TAS PROM 95 validates the fields of each data transaction. As shown, the field validation routine starts at step 182 and first determines at step 184 what field type is present. If the present field is an alphanumeric field, control passes to step 186 where the field defaults are processed. It is then determined at step 188 whether the user knows the values allowed for this field. If not, and data is to be implanted in that field, an implant table is searched at step 190. A "?" may be used by the operator to indicate that he or she does not know the values allowed for this field and wishes to search the implant table. A list of possible values are then called up that match the data entered thus far. From this list, the operator can scroll the list and select the value that will complete the data entry. However, if the value is not found in the list, a field error is generated at step 192 and the field validation routine is exited at step 194. If the value is found in the list, control passes to step 200.

On the other hand, if at step 188 it is determined that data need not be added (implanted) into the present field, control skips to step 196, where it is determined whether the present field type is a field which sets up an event in which the present field (along with its form) can be linked to any record of any file or files (one to many) of any database for the purpose of data verification and/or data extraction. If so, control passes to step 198, where the data from the present field along with any other data previously gathered is used to make the desired link. As in the data implant step 188 noted above, the user may enter a "?" to get the information needed to make this link. If the data for the link is not found, a field error is issued at step 192 and the field validation routine is exited at step 194. However, if the data for the link is found, the field is checked for blanks at step 200 and a field error is issued at step 192 if blanks are present in the field but are not allowed. If no blanks are found in the present field, or if blanks are found but are allowed, the field validation routine is exited at step 202.

If it is determined at step 184 that the present field is a numeric field, the field is checked at step 204 to determine if the character set is valid. If so, the precision of the numbers is adjusted at step 206, as necessary, and the range and scope of the numbers are checked at step 208 to make sure the field entries satisfy the boundary conditions (e.g., no dividing by zero). If the character set is not valid at step 204 or the range and scope of the numerals is not valid at step 208, a field error is issued at step 210 and the data validation routine is exited at step 212. Otherwise, the field validation routine is exited at step 214.

If it is determined at step 184 that the present field is a date/time field, the field is checked at step 216 to determine if the character set is valid. If not, a field error is issued at step 210 and the field validation routine is exited at step 212. Otherwise, a routine of the TAS firmware checks the date/time entry at step 218 to determine if it has the correct format by performing range checking and the like. If the date/time entry does not have the correct format, a field error is issued at step 210 and the field validation routine is exited at step 212. Otherwise, it is determined at step 220 whether the present field contains a date. If not, the data validation routine is exited at step 221. If so, the date is checked at step 222 so see if it contains a weekend, and, if so, checks at step 224 whether a weekend date is an acceptable reply for this field. It is then determined at step 226 whether the calendar file is to be checked, and if so, the calendar file is checked at step 228 to see if the date is valid (e.g., not a February 30 and the like). Finally, it is determined at step 230 whether a warning date has been exceeded, and if so, a field error is issued at step 210 before the field validation routine is exited at step 212. Otherwise, the field validation routine is exited at step 221.

Those skilled in the art will appreciate that, in order to maintain security, the TAS firmware may also present a security form for password entry by the user. The security form and ID of the transaction entry device 12 is then encrypted and transmitted to the database server 28 associated with the particular TAS 18. Transaction controller 36 of that database server 28 will then act as the transaction controller for that TAS 18 and will check passwords and the like during operation to make certain that data security is not breached. Database servers 28 may disable a TAS 18 if unauthorized use is attempted. In this manner, only the appropriate person may view each menu. Of course, a different number of security levels and different executive menus may be presented as desired, all under control of the transaction controller 36. Such a security feature is particularly desirable for use of the data transaction entry device 12 in home banking (described below).

C. Database Server 28

As noted above, the database server 28 may act as a vehicle for separating data transactions created by the TAS 18 into the component parts thereof which may be stored directly in one or more databases 30 and 40. In other words, the database server 28 explodes the initial data transaction into data transactions for many different files for updating records in the files, and the like. Also, the database server 28 may be virtual as well as real, exist in a single machine or in multiple machines, in whole or in part. As will be explained in more detail below, database server 28 may further include all of the forms and menus needed for completion of transactions associated with particular applications supported by that database server 28.

Generally, the database server 28 handles any and all data transactions received, manipulates data in the data transactions, spawns or starts processes or reports requested by a data transaction, explodes the received data transactions into all sorts of data transactions that were spawned by the initial data transaction, and/or interactively or on demand feeds data options to the TAS 18 for selection. Database server 28 can also update values in existing records and can switch to a process for processing values in the records as necessary. In this manner, a single data transaction can define actions causing multiple files to be updated. Database server 30 also handles requests from the TAS 18 and processes them as needed. Such requests may include data I/O requests, data locking and unlocking, report processes, and requests for new forms or menus. Those skilled in the art will appreciate that database server 28 maintains the one-to-many relationships that exist between the user and the system of the invention, the one-to-many presentations to the user and files in the databases 30 and 40, the one-to-many data transactions to the ancillary records, as well as the updates and postings as may be required to diverse computer files of numerous databases 40 via the transaction entry device 12 and the database servers 28.

As noted above, transaction buffer 97 collects the transaction data associated with the form presented to the user via display screen 20. The transaction buffer 97 is the image of the data transaction with appropriate locations for each separate data element. The contents of the transaction buffer 97 are transferred to the database server 28 via modem interface 78 or via RF transceiver 90, preceded by a set of codes 44 (FIG. 2) which identify the type of transaction followed by a string of process identifiers for the database server 28 to use in its programs, in creating additional data transactions, and in storing the data and all ancillary transactions within the database 30 in the regular file format of the database 30. In other words, the database server 28 determines what type of action to take based on the type of data transaction received, "explodes" a data transaction into a plurality of other data transactions for transmission to other databases, as appropriate, and converts the data for its associated database 30 into the proper file format. A database server 28 also may simply download menus and forms upon request by a TAS 18. Of course, each database server 28 is different from each other database server 28 since it will handle different types of data transactions, have different operating system characteristics, and make different file conversions in accordance with the file formats of its associated database 30. For example, the database server 28 may operate under an operating system such as UNIX™, Windows™, or DOS™, where the operating system provides the database server 28 with links to the hardware functions normally handled by an operating system. Preferably, the database server 28 also operates with menus, forms, and the like in the same fashion as the TAS 18 except that it stores the data transactions in its associated database 30 as transaction files.

As just noted, the purpose of the database server 28 is to process the data transaction from the TAS 18 and to either explode the data transaction into all of its related components for storage, to handle the storage of items from the explosion process, to store the data transaction itself for reference purposes, and to act as a supplier of information, menus, and/or forms to the TAS 18 in response to requests during the creation of the data transaction and during the downloading of parameters for menus and forms to the TAS 18. If desired, the database server 28 can also supply information back to the TAS 18 after a data transaction is received or can initiate a process leading to the delivery of a report, data, or menu to the TAS 18. In addition, the database server 28 and TAS 18 can reside on the same machine so long as the database server's operating system recognizes the TAS firmware or the TAS firmware is modified for use with the operating system of the database server 28.

D. Applications of a Data Transaction Entry Device With a TAS

As outlined above, the present invention includes a point of transaction device (or a personal computer which emulates such a device) which presents one or more menus to a user from which options are selected. A form tailored to the selected option appears for guiding the user through data entry. The full details of the data transaction are captured as data is entered by the user. Modem interaction with a central database(s) or a user database(s) allows for interaction for help and validation of certain entered data. The completed transaction is then transmitted to the central database or user database for further processing and storage. Data input can also be provided via a swipe card, memory card, smart card, CD ROM, or floppy disk, from data received from any database accessible via a cellular, wired or wireless modem interface, or other known methods.

A data transaction system of this type may be used for many applications. For example, in a first application, the transaction entry device 12 is located in a medical office for entry of patient data. In this application, a swipe card, a memory card, a smart card, a CD ROM, a floppy disk, a keyboard entry, or the like identifies the patient and the doctor, and a cellular, wired or wireless modem connection allows the entire claim transaction to be entered and transmitted to the insurance companies for processing. The patient records may also be automatically updated and prescriptions created, given to the patient, transmitted to the pharmacist, and transmitted to the payor and patient record. Patient instructions such as special diets, exercises, treatments, appointments, and the like may be printed from the data transaction form at the doctor's central computer. In addition, a video image or picture provided via video input 74 and compressed by data compression circuitry 75 permits an image of a medical condition such as a rash to be appended to the data transaction (in miscellaneous processing field 50 of FIG. 2) for transmission with the patient's name, the date, a description of patient symptoms, and the like. Similarly, a recorded heartbeat or other patient vital sign may be appended to the end of the data transaction for transmission with the patient data.

The form driven operating system implemented using TAS 18 also permits the data transaction entry device of the invention to be used in numerous interactive embodiments such as home banking, home shopping, and Internet e-mail. In particular, since each set of menus and forms effectively reprogram the TAS 18 to perform the function(s) supported by the set of menus and forms currently being completed by the user, downloading the menus and forms from a particular server permits a data entry device or host computer with a TAS 18 to be configured for virtually any application requiring data input. This characteristic of the invention is illustrated by way of example in FIG. 11.

Figure 11:
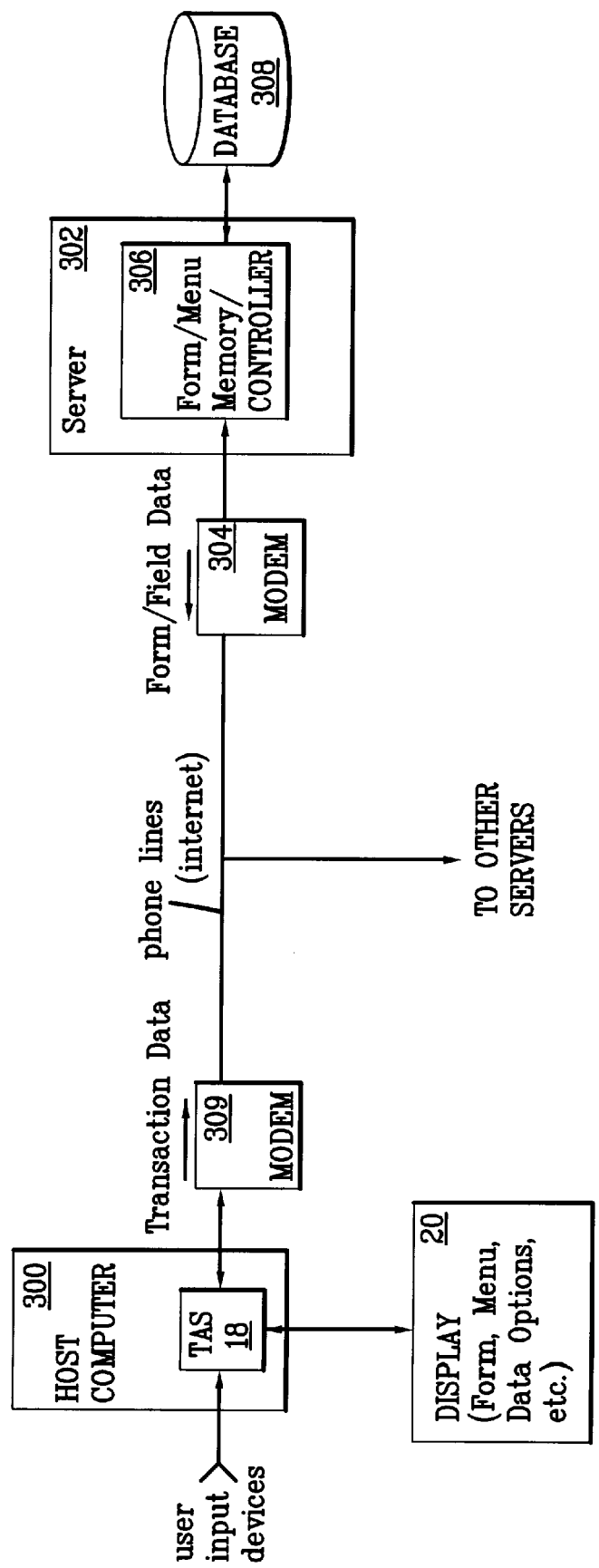
FIG. 11 illustrates how TAS may be used to reconfigure a host computer for any user input application in accordance with the techniques of the invention.

FIG. 11 illustrates a system similar to that illustrated in FIG. 1 except that the telephone electronics are optional and only a single server is illustrated. In this embodiment, the TAS 18 operates on a host computer 300 (with or without telephone electronics) and server 302 is the server of the organization for which the user of the host computer 300 wishes to communicate. As in FIG. 6, TAS 18 may be implemented on a board of the host computer 300 or may be loaded on a PCMCIA card and the like and inserted into the host computer 300. As illustrated, the TAS 18 of the host computer 300 communicates with server 302 over the phone lines or Internet via cellular, wired or wireless modems 304 of the host computer 300 and the server 302. Alternately, data transmissions may be made via an RS-232 port of the host computer 300. As in the embodiment described above, the TAS 18 creates data transactions which are transmitted to the server 302, while server 302 returns forms, menus, field data, and the like in the selected language to the TAS 18 of host computer 300 for completion of the desired data transactions. Access to field data and the like in database 308 is controlled by controller 306. Controller 306 also controls the downloading of forms and menus to the TAS 18 as appropriate.

The embodiment of FIG. 11 permits interactive communication as follows. If a user of the host computer 300 wishes to make, for example, an airline, hotel, or train reservation, or review a restaurant menu, and the like, the user selects the appropriate option from the master menu presented on display 20 by TAS 18. TAS 18 then creates a connection with the airlines reservation or other appropriate server (server 302) via the phone lines. TAS 18 then sends a request for the menus and forms used by the server 302 in completing an airlines reservation or other transaction in a particular language. Form/menu controller 306 then returns (downloads) the requested menus and forms to the TAS 18 via the phone line connection using conventional protocols. The user then navigates through the menus downloaded from the server 302 and selects the appropriate form for data entry. This form is completed as described above (which may require additional data transactions to be transmitted to/from the server 302 to complete the fields) and transmitted to the server 302 upon completion. The server 302 may then acknowledge receipt and process the request in a real-time fashion (while the connection is maintained), or the completed form may be stored for off-line processing.

Figure 12:
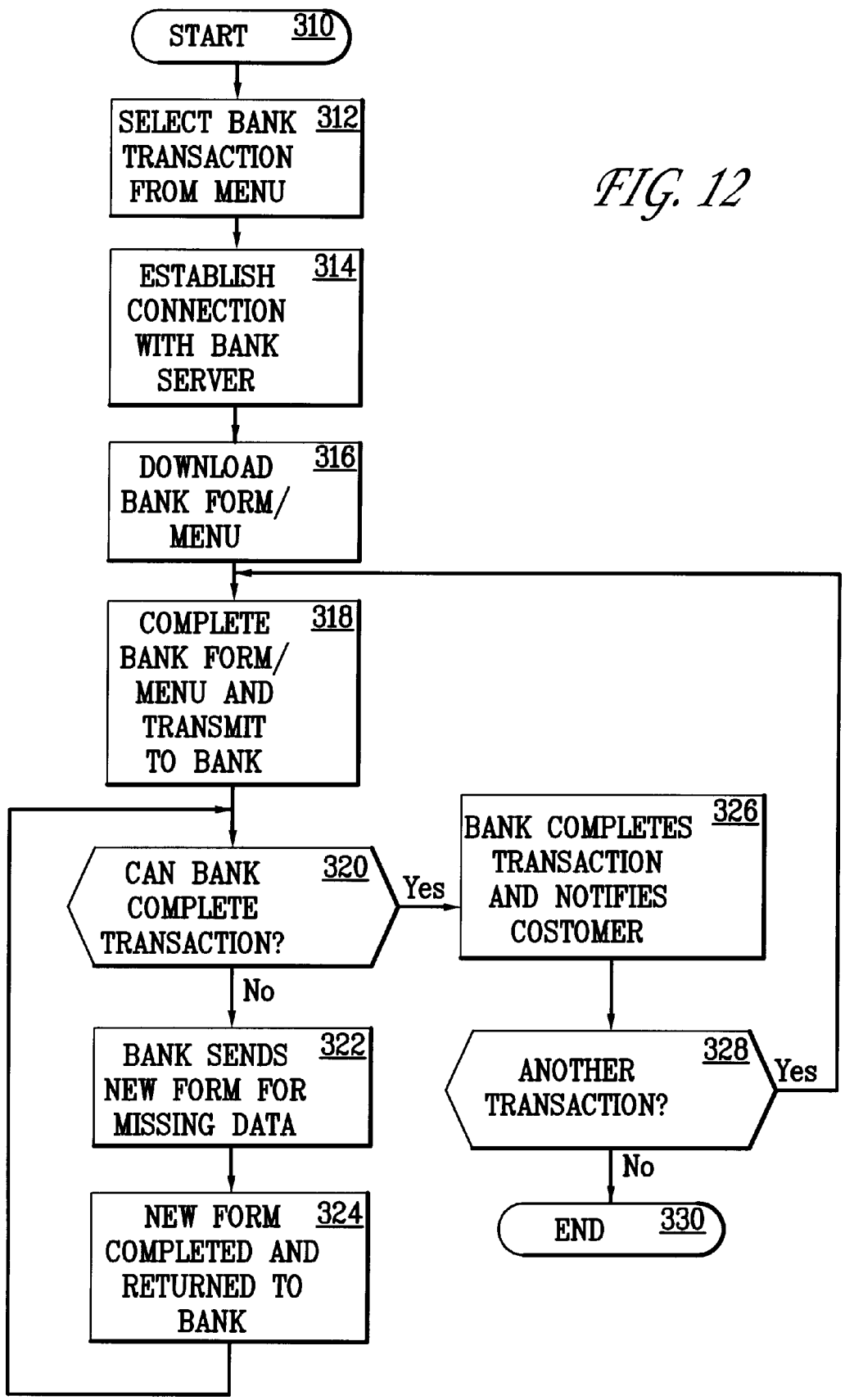
FIG. 12 is a flow diagram illustrating how TAS may be used in a home banking context.

Such a configuration permits the data transaction entry system of the invention to be used for numerous other home uses. For example, the transaction entry device may be used for performing bank transactions or shopping from the home in a desired language. In this case, forms would be made available by the bank or shopping service for downloading for different types of transactions. These forms would be downloaded to the TAS 18 in the customer's home computer 300 or transaction entry device 12 and used in creating and transmitting data transactions to the bank's or shopping service's server 302 for processing. A flow diagram of this process for use in completing bank transactions is shown in FIG. 12. Those skilled in the art will appreciate that similar techniques may be used for conducting shopping from the home using TAS 18.

As illustrated in FIG. 12, the user starts at step 310 by selecting at step 312 a bank transaction option from the master menu presented by the TAS 18 to the display 20. TAS 18 then establishes a connection with the bank server 302 at step 314, which may require entry of the user's PIN number or other security number. The form/menu controller 306 then downloads to the TAS 18 the menus and forms (in the selected language) needed for transactions with the bank server 302. The user then navigates the menus provided by the bank server 302 and completes the form for the desired transaction at step 318 (e.g., a check of a savings account balance, to transfer funds, pay bills, load smart cards issued by the bank with electronic cash, send email messages to the bank, and the like), and TAS 18 transmits the completed form to the bank server 302. The bank server 302 then determines at step 320 if it has all the information it needs to complete the requested transaction. If more information is needed, the bank sends a new form for the missing data at step 322, or conversely, sends a data transaction to TAS 18 informing the user to add or change certain information and resend the form. The new form (or the corrected form) is then completed and returned to the bank server 302 at step 324. If the TAS 18 is being used to complete cash withdrawal forms, as for home ATM use, the user's swipe card, memory card, or smart card may be updated by downloaded electronic cash, as appropriate. If the bank server 302 determines at step 320 that it has enough data to complete the requested transaction, the bank server 302 completes the transaction at step 326 and notifies the customer by sending a data transaction back to the TAS 18. If it is determined at step 328 that another transaction is desired, control returns to step 318 so that the user can once again navigate the downloaded menus and forms; otherwise, the transaction is completed and the phone connection is closed at step 330. In this fashion, TAS 18 permits the customer to perform bank transactions and transactions with a variety of retail establishments from the home using simple menu choices with no knowledge of computers.

Figure 13:
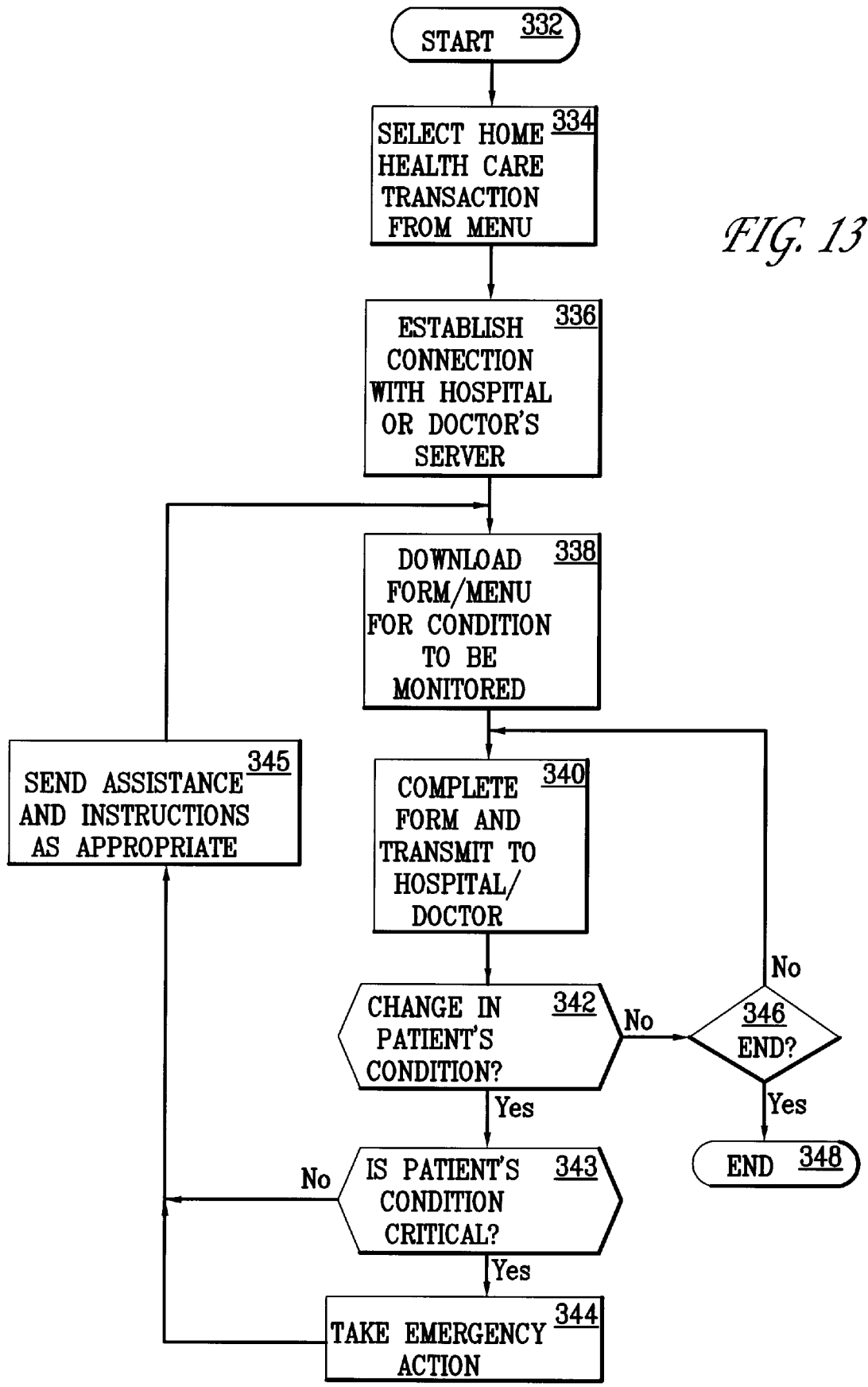
FIG. 13 is a flow diagram illustrating how TAS may be used in a home health care (remote monitoring) context.

As another example of a use of TAS 18 in the home, the afore-mentioned medical example may be modified to permit home patient monitoring. In this embodiment, the host computer 300 or transaction entry device 12 with TAS 18 would be located at the patient's home and would include the modem numbers of the server 302 (FIG. 11), which in this embodiment would be located at a doctor's office or hospital which is to monitor the patient's condition. FIG. 13 is a flow diagram illustrating how TAS is used in such a home health care (remote monitoring) context.

As shown in FIG. 13, the user (nurse or patient) starts at step 332 by entering any necessary user ID and password and then selecting the home health care monitoring transaction option from the master menu (in the appropriate language) at step 334. A set of forms and menus tailored to the patient's condition is either preloaded into the patient's host computer 300 or transaction entry device 12 by the server 302, or TAS 18 first establishes a connection with the server 302 at step 336 and then downloads at step 338 the necessary forms and menus for the condition(s) to be monitored. Alternatively, the user may simply phone his or her doctor for instructions, and the doctor will have the correct forms downloaded. For example, a patient suffering from breathing difficulties may receive a form of the type illustrated in FIG. 14. As illustrated by the prompts in the form of FIG. 14, vital signs data such as heart rate and blood pressure (fields C and D) and oxygen saturation (field E) may need to be entered to complete the fields. For this reason, it is specifically contemplated that the host computer 300 and/or data transaction terminal 12 may use one or more of its input ports to directly accept the readouts from home vital signs monitors so that the readings may directly populate the forms without keying by the patient. However, other data such as symptoms, complaints, patient history, and the like are typically keyed in by the patient or his or her attending medical personnel. Once the form is completed, it is transmitted to the server 302 at step 340 via a connection established at step 336 by modem 78 or modem 304. The data transaction containing the patient's vital signs data is then stored in database 308 by the memory controller 306 and, preferably, displayed at the server site for constant monitoring by medical personnel. While it is contemplated that most patients will be monitored periodically at a rate determined by the patient's doctor or nurse, the system of the invention may also use the structure of the data transaction (FIG. 2) to continually send symptoms and vital signs data to the server 302 for storage and/or real-time monitoring. The medical personnel may send data transactions back to the patient at the designated times to remind the patient that a new reading needs to be taken and transmitted, or may send new medical protocols, instructions, prescriptions, and the like.

If the medical personnel (or even a computer program at the server 302 which is programmed to recognize problematic changes in the patient's vital signs data) detects a change in the patient's condition during off-line review of the received vital signs data or during a real-time review at step 342, then it is determined at step 343 whether the changes are routine (non-critical) or representative of a need for urgent medical attention (critical). If the changes indicate that urgent medical attention is needed, an alarm may be sounded and medical personnel notified of the patient's condition and/or dispatched to the patient's home at step 344. Other appropriate emergency action will be taken as appropriate. In accordance with whether the change is critical or non-critical, appropriate new instructions and changed medications are sent to and/or a telephone conference with medical personnel is established with the patient at step 345. Also, if the changes are non-critical, appropriate new instructions and changed medications may be sent to the patient and a new form may be downloaded at step 345 for completion by the patient at step 338 so that additional vital signs data may be gathered before taking further action. On the other hand, if no change in the patient's condition is detected at step 342, it is determined at step 346 whether the patient monitoring is to continue. If so, the patient monitor is reset for the next data transaction and control returns to step 340 for processing of the next form; otherwise, the process ends at step 348 and the modem connection is terminated.

Those skilled in the art will further appreciate that the patient in the embodiment of FIG. 13 may select/download a different form at any time for monitoring of different vital signs and symptoms. Those skilled in the art will also appreciate that it is not necessary to maintain a permanent connection when the patient is only being spot checked at regular intervals (e.g., daily). In this case, a new connection may be made and terminated for each form or series of forms comprising the update of the patient's medical condition. Also, the computer 300 with TAS 18 need not be located in the patient's home, but TAS 18 may be part of a medical kiosk or may be located at the medical facility to optimize the patient coverage by the on-duty medical personnel. In addition, a separate voice line may be used by the patient to request help or by the medical personnel to provide new instructions to the patient until medical personnel can arrive. Similarly, the patient may be called or paged at periodic intervals to be reminded to provide the symptoms and vital signs data needed for the remote patient monitoring in accordance with the invention. In more critical cases, the monitoring of the patient's vital signs data may be continuous via a dedicated connection.

As another example, the user may dial-up to a 900 number to get an interface to a central database via a server which downloads codes from the central database into TAS PROM 95 or form/menu memory 96 which enable the generation of infrared or other wireless signals at certain frequencies. The user needs only to specify in an appropriate form the type, make and model of any electronic device to be controlled in order to get the desired code. Then, to operate any electronic device in the home, the user would be directed by menu prompts. The transaction entry device 12 or host computer 300 would then emit an infrared or other wireless signal via transceiver(s) 80 to operate the electronic device.

For other home uses, the transaction entry device 12 or computer 300 may also initiate, via menu prompts, sequences for turning on and off various household devices including alarm systems, coffee makers, and the like. In this mode, the transaction entry device 12 or computer 300 may receive an RF wireless or infrared signal indicating that a burglar or fire alarm has been activated and call up a form for calling the police or fire department, as appropriate. A call to the transaction entry device 12 or a data transaction via cellular, wired or wireless modem 304 of the computer 300 may then be used to turn off the burglar or fire alarm by changing a field in a form which instructs the transceiver 80 or RF transceiver 90 to send an appropriate control signal to the alarm device. This feature may also be prompted from a car phone via remote initiation of the form performing this function.

The transaction entry device 12 may also control all household telephone use as well as controlling the answering machine and keeping a telephone transaction log. The user may also pay household bills by completing an appropriate form and transmitting the form to a payee such as a credit card company, a bank, and the like. In short, the transaction entry device will permit the owner to connect to a remote database without owning a conventional computer system or understanding computer operation.

Similarly, the user may dial directory assistance to download a portion of the telephone directory by simply completing a form identifying the desired portion of the telephone directory and sending it as a data transaction.

For personal applications, the transaction entry device 12 may be used to initiate a facsimile transmission, to provide telephone lists with automatic dialing upon selection, to provide expense accounts, personal scheduling, tax record keeping, and the like, and to provide direct access to travel information. For example, as noted above, the database server 28 or 302 may be an airline reservations system. A swipe card or memory (PCMCIA) card may be used to provide credit card payment information and may be updated by permitting the TAS 18 to write to the swipe card or memory card as noted in the above home banking example. The user may also access frequent flyer club and mileage data, special offers on hotels, cruises and other travel, and the like, via data transactions.

In another home (or business) use, the transaction entry device 12 may be used to eliminate conventional phone mail greetings by enabling the caller's transaction entry device 12 to read in a set of visible menus from the called party's voice mail menu so that the calling party may select the desired options using a visible menu rather than a voiced menu. In other words, the caller would not have to wait through the litany of voiced phone mail options before making a selection and could make the desired selection right off of his or her own display. This would be accomplished by selecting a process from the menu of the transaction entry device 12 which will create a "visible" menu. When such a process is selected, the telephone electronics 14 or modem interface 78 makes a telephone connection to a remote phone mail system. Once the connection is made, the TAS 18 sends a data request for a visual representation of the phone mail menu of the remote phone mail system via the telephone connection to the remote phone mail system. A data stream containing the visual representation of the phone mail menu from the remote phone mail system is then returned via the telephone connection and stored in form/menu memory 96 and presented to display screen 20 of the transaction entry device 12 for selection using the techniques described herein. When menu items are selected from the "visible" voice mail menu, the TAS 18 creates a data transaction indicating which menu item was selected and sends the data transaction to the remote phone mail system via the telephone connection. Based on the menu selection, the remote phone mail system then returns a data stream containing a visual representation of the next phone mail menu via the telephone connection for storage in form/menu memory 96 and display on display screen 20. This process is repeated until the calling party is required to leave a message or the called party is reached. Such a system would be particularly helpful for interacting with voice mail systems, such as those at government offices, where numerous options are presented for selection.

Figure 15:
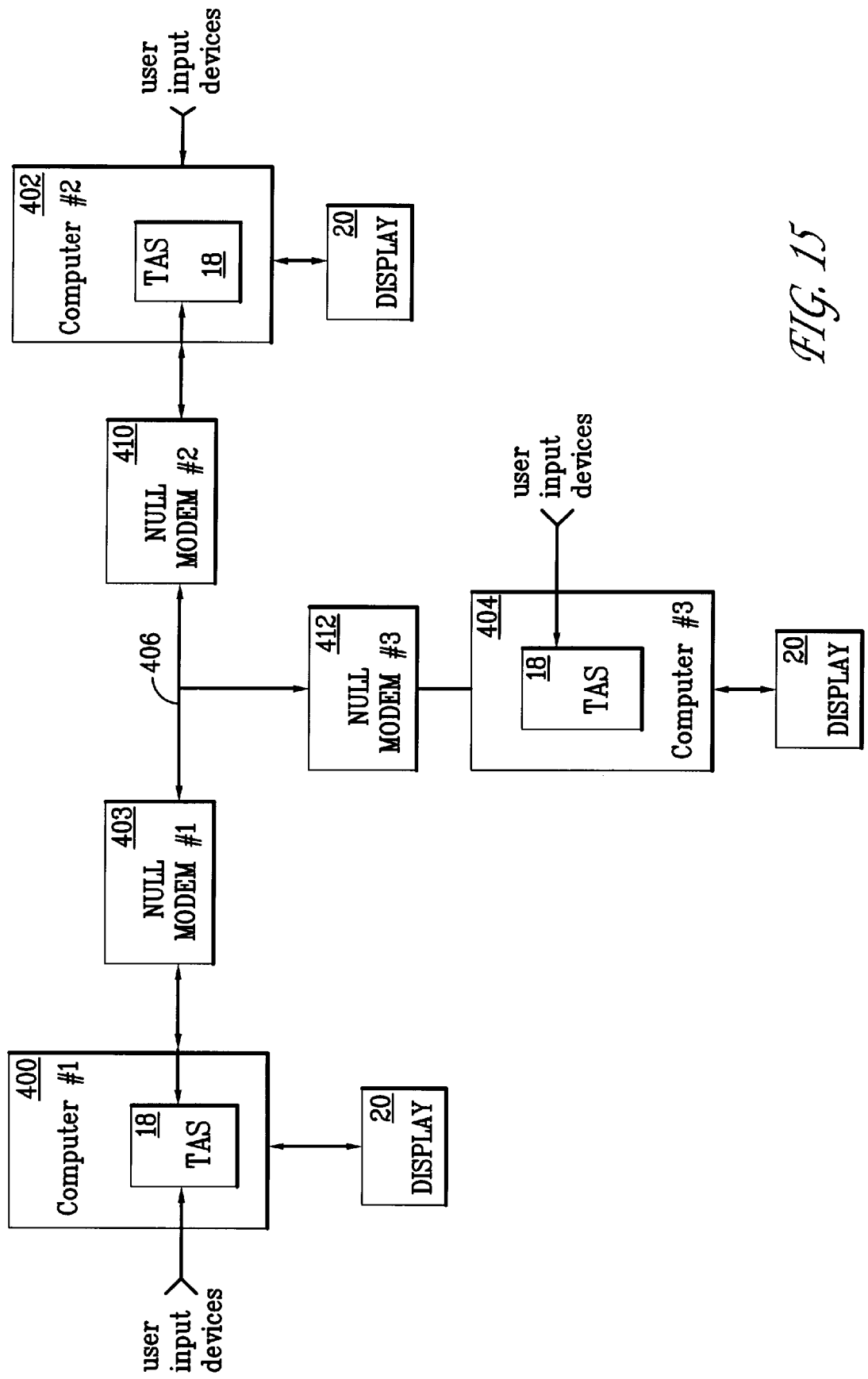
FIG. 15 illustrates a small scale network in which several computers having a TAS are connected to share data without requiring a sophisticated (and costly) network interface.

The inventor has also recognized that the form driven operating system techniques of the invention may be used to develop a cost-effective small scale data network in a home or small office. For example, FIG. 15 illustrates a small scale data network in which several personal computers or transaction assembly devices having a TAS loaded thereon (on an internal board or on a PCMCIA card or the like inserted into the personal computer) are connected to share data without requiring a sophisticated (and costly) network interface. In the illustrated embodiment in FIG. 15, computers 400, 402, and 404, each having a TAS 18, are connected to each other via an RF or fiber optic cable(s) 406. Each computer is connected to the cable 406 via a conventional null or real cellular, wired or wireless modem 408, 410, or 412, respectively, instead of the conventional HUBs, Ethernet cards, and/or network software which are typically very expensive. Data transactions are sent from device to device by filling out respective forms and communicating the data via the null modem (connector) or real cellular, wired or wireless modem as data transactions. The data transactions merely need to contain the address of the destination device (e.g., computer 1, 2, or 3), and each device needs to merely look for data addressed to it and to ignore all other data transactions. Thus, each device having a TAS effectively functions as a data transaction "tuner" which reads the address field of all incoming data but only receives and stores data transactions addressed to it. Due to this characteristic of the system, there is no need to resolve data conflicts, thereby greatly simplifying the transmission hardware and software. Similarly, one or more servers may be connected to such a network, each server simply "tuning" to data transactions from particular source devices.

Those skilled in the art will appreciate that TAS 18 can be implemented as part of a stand alone data transaction device or implemented in a personal computer which is reconfigurable to virtually any application for which data may be entered into forms and transmitted as data transactions, or as part of a cellular telephone adapted to include a small display for presenting TAS forms. The data transactions created by TAS during the completion of a form can be used to request an Internet connection and then to broadcast over the Internet a data transaction for receipt by particular database servers which "tune" to data transactions having the designated source address or which have a destination address specified in the data transaction. Each TAS 18 may also have its own unique address so that it can "tune" to transactions directed to it and ignore all other transactions. Thus, TAS 18 can further function as a "PUSH" receiver.

Those skilled in the art will further appreciate that the invention is unique by virtue of its ability to generalize applications to forms so that no code needs to be written and compiled to implement a particular function. However, if code is needed or if multimedia data is to be part of a data transaction, it can be attached to a form as a parameter stream in a stream of data. Also, though the transaction entry device 12 has been described as a hybrid computer/telephone and as part of a personal computer, those skilled in the art will appreciate that it can also be used in conjunction with an optional off-line storage device as a self-contained workstation and database unit independent of traditional operating systems. The transaction entry device 12 can also be used with an additional optional plug in as a network server or as a user interface in a network docking station. Also, the TAS of the invention may be used in a conventional operating system environment; the benefits of TAS would still be obtained since it would not be necessary to load an application program for those new functions which can be supported by forms and data streams. For example, the language of a particular application can be easily changed by changing the forms, thereby eliminating the costs traditionally associated with converting application programs and their interfaces into other languages.

Those skilled in the art will also appreciate that the foregoing has set forth the presently preferred embodiments of the invention but that numerous alternative embodiments are possible without departing from the novel teachings and advantages of the invention. The numerous embodiments of TAS mentioned above are certainly not exhaustive. For example, the TAS of the invention may be inserted into other devices such as televisions, cable modems, set top boxes, and the like for communications over the Internet or through local cable networks and the like. Numerous other embodiments and variations of the mentioned embodiments are certainly possible within the scope of the invention. Accordingly, all such embodiments and modifications are intended to be included within the scope of the appended claims.

We claim:

1. A data transaction assembly server (TAS), which controls a microprocessor to create and receive data transactions, said TAS comprising a computer readable medium which stores therein a form driven operating system which controls said microprocessor to accept input data of a desired transaction type using control data comprising at least one form presented to a user by said form driven operating system for eliciting data input of said desired transaction type from said user, said at least one form including at least one prompt customized to said desired transaction type, said form driven operating system further formatting at least any data input by said user in response to said at least one prompt into a data transaction for processing, and which includes a form/menu memory which stores said at least one form.

2. A TAS as in claim 1, wherein said computer readable medium comprises a flash PROM which stores said form driven operating system and said form/menu memory comprises a RAM.

3. A TAS as in claim 1, wherein said computer readable medium comprises one of a memory card, and a smart card, a swipe card, a CD ROM, and a floppy disk.

4. A TAS as in claim 1, further comprising a transaction buffer which stores at least one data transaction to be transmitted until said at least one data transaction is ready for transmission and which stores at least one received data transaction until said at least one received data transaction is ready for processing.

5. A TAS as in claim 4, wherein said control data controls said microprocessor to fetch a menu from said form/menu memory for navigating to said at least one form, said menu listing certain forms of all available forms which are resident in said form/menu memory or which may be downloaded from a remote server to said form/menu memory upon user selection, and to fetch a form selected from said menu by said user.

6. A TAS as in claim 5, wherein said control data further controls said microprocessor to process said selected form by initializing said transaction buffer to accept said data input of said desired transaction type in response to prompts in said selected form and, upon completion of a data transaction including responses to said prompts in said selected form, saving said data transaction to said transaction buffer until said data transaction is to be transmitted.

7. A TAS as in claim 6, wherein said control data controls said microprocessor to navigate said user through respective prompts of said selected form and to transmit said data transaction to said remote server for processing upon completion of at least one said data transaction.

8. A TAS as in claim 7, wherein said control data controls said microprocessor to cause an inquiry data transaction to be created in response to predetermined data inputs from said user indicating that the information requested by a particular prompt is unknown, to cause said inquiry data transaction to be transmitted to said remote server for retrieval of the information requested by said particular prompt, and, if the information requested by said particular prompt is found and returned by said remote server, to cause said requested information to be stored in said transaction buffer as a response to said particular prompt or to be displayed to the user for menu selection.

9. A TAS as in claim 6, wherein said control data controls said microprocessor to determine whether data input by said user in response to one of said prompts will invalidate data input by said user in response to another of said prompts and to selectively update all affected data input or to set default values to prohibit inconsistent data entries by the user.

10. A TAS as in claim 6, wherein said control data controls said microprocessor to validate data input by said user in response to each of said prompts in said selected form, the validation varying in accordance with whether said prompt requested alphanumeric, numeric, or date/time data input from said user.

11. A TAS as in claim 10, wherein said control data controls said microprocessor to send reply data input by said user in response to a particular prompt in said selected form to said remote server for validation.

12. A TAS as in claim 11, wherein, in response to a validation request by said microprocessor in connection with said reply data input by said user in response to said particular prompt in said selected form, said remote server returns data related to said reply data as a response to said particular prompt or option data for display to the user for menu selection.

13. A method of entering data transactions into a transaction entry device comprising a microprocessor and a computer readable medium which stores a form driven operating system which controls said microprocessor to accept input data of a desired transaction type using control data comprising at least one form presented to a user by said form driven operating system for eliciting data input of said desired transaction type from said user, said at least one form including at least one prompt customized to said desired transaction type, and which stores a form/menu memory which stores said at least one form, and a transaction buffer which stores at least one data transaction to be transmitted until said at least one data transaction is ready for transmission, comprising the steps of:

fetching a menu from said form/menu memory for use in navigating to said at least one form, said menu listing certain forms of all available forms which are resident in said form/menu memory or which may be downloaded from a remote server to said form/menu memory upon user selection;

selecting a form from said menu;

fetching the selected form;

initializing said transaction buffer to accept said data input of said desired transaction type in response to prompts in said selected form;

navigating through respective prompts of said selected form and providing said data input of said desired transaction type in response to said respective prompts;

formatting said data input in response to said respective prompts into a data transaction for processing; and upon completion of a data transaction including said data input in response to said respective prompts in said selected form, storing said data transaction in said transaction buffer until said data transaction is to be transmitted.

14. A method as in claim 13, comprising the further steps of:

creating an inquiry data transaction in response to predetermined data inputs indicating that the information requested by a particular prompt is unknown;

transmitting said inquiry data transaction to said remote server for retrieval of the information requested by said particular prompt; and if the information requested by said particular prompt is found and returned by said remote server, storing said requested information in said transaction buffer as a response to said particular prompt or displaying said requested information to the user for menu selection.

15. A method as in claim 13, comprising the further steps of:

determining whether data input in response to one of said prompts will invalidate data input in response to another of said prompts; and selectively (1) updating all affected data input and (2) setting default values to prohibit inconsistent data entries in response to respective prompts in the selected form.

16. A method as in claim 13, comprising the further step of:

validating data input in response to each of said prompts in said selected form in accordance with whether said prompt requested alphanumeric, numeric, or date/time data input from the user.

17. A method as in claim 16, wherein said validating step comprises the step of sending reply data input by said user in response to a particular prompt in said selected form to said remote server for validation.

18. A method as in claim 17, wherein said validating step comprises the further step of returning from said remote server, in response to a validation request by said microprocessor in connection with said reply data input by said user in response to said particular prompt in said selected form, data related to said reply data as a response to said particular prompt or option data for display to the user for menu selection.

19. A data transaction processing system, comprising:
   a transaction entry device comprising a microprocessor and a computer readable medium which stores a form driven operating system which controls said microprocessor to accept input data of a desired transaction type using control data comprising at least one form presented to a user by said form driven operating system for eliciting data input of said desired transaction type from said user, said at least one form including at least one prompt customized to said desired transaction type, said form driven operating system further formatting at least any data input by said user in response to said at least one prompt into a data transaction for processing, and which stores a form/menu memory which stores said at least one form;
   a transmission medium; and
   a server connected to said transaction entry device via said transmission medium, said server processing data transactions from said transaction entry device which include a form customized to a transaction type supported by said server, said processing performed by said server including at least one of (1) communicating said data transactions to another server for processing, and (2) processing said data transactions and returning at least one of additional forms, responses to prompts in said form customized to said transaction type supported by said server, and processed data to said transaction entry device as data transactions.

20. A system as in claim 19, wherein said transmission medium comprises a cellular, wired and/or wireless telephone line connection and said transaction entry device and server each have a cellular, wired and/or wireless modem.

21. A system as in claim 20, wherein said telephone line connection includes a low power wireless connection.

22. A method of providing data communication between a database and a transaction entry device comprising a microprocessor, a display, an input device, and a computer readable medium which stores a form driven operating system which controls said microprocessor to accept input data of a transaction type accepted by a database server associated with said database, said form driven operating system comprising form control data and at least one form presented to a user for eliciting data input from the user of the transaction type accepted by the database server, said at least one form including at least one prompt customized to said transaction type accepted by the database server, and which stores a form/menu memory which stores said at least one form, and a transaction buffer which stores at least one data transaction until said at least one data transaction is ready for transmission, comprising the steps of:
   presenting to said display said at least one form including said at least one prompt customized to said transaction type accepted by the database server;
   said user completing said at least one form by entering data responsive to prompts in said at least one form into said transaction entry device using said input device;
   formatting at least the responsive data entered by said user in response to said prompts in said at least one form into a data transaction for transmission to said database server;
   transmitting said data transaction to said database server;
   said database server receiving said data transaction; and
   determining if said data transaction may be processed by said database server without further user input and, if said data transaction may be processed without further user input, processing said data transaction; otherwise, said database server returning at least one of an additional form and a data transaction containing one of a response to a particular prompt in said at least one form and instructions to said transaction entry device for presentation on said display.

23. A method as in claim 22, wherein said form presenting step comprises the steps of:
   presenting a menu to said display, said menu listing certain forms of all available forms which are resident in said form/menu memory or which may be downloaded from a remote server to said form/menu memory upon user selection; and
   navigating said menu using said input device; and
   selecting said at least one form from said menu.

24. A method as in claim 22, wherein said form presenting step comprises the steps of:
   presenting a menu to said display so that said user may select a desired transaction type supported by said database;
   establishing a cellular, wired or wireless modem connection with said database server;
   sending a request to said database server via said modem connection for at least one form of said desired transaction type from said database server; and
   said database server transmitting said at least one form to said transaction entry device for presentation to said display.

25. A method as in claim 22, wherein said form presenting step comprises the steps of selecting a human language of said form and presenting a menu to said display containing a selection of forms in the selected human language.

26. A method as in claim 22, wherein said form completing step comprises the steps of:
   said user requesting assistance in providing input data in response to a particular prompt in said at least one form;
   said transaction entry device transmitting an inquiry data transaction to said database server or a predetermined database server, said inquiry data transaction including a request for input data responsive to said particular prompt in said at least one form; and
   said database server or said predetermined database server providing said input data responsive to said particular prompt to said transaction entry device for inclusion in said data transaction in said formatting step.

27. A method as in claim 22, wherein said at least one form relates to a desired bank transaction at a bank having said database server, said database server processing data provided in the data transaction including said at least one form and returning a notification to the user indicating whether the data transaction has been successfully processed.

28. A method as in claim 27, wherein said step of processing said data transaction comprises the step of sending a further data transaction including electronic cash from said database server to said transaction entry device.

29. A method as in claim 22, wherein said at least one form relates to at least one of symptoms, complaints, patient history, and vital signs data of a patient, and said database server is located at a remote location for remote monitoring of said patient by medical personnel by monitoring changes in transaction data received from said patient.

30. A method of remotely monitoring a patient's condition using a transaction entry device comprising a microprocessor, a display, an input device, and a computer readable medium which stores a form driven operating system which controls said microprocessor to accept input data of a transaction type accepted by a server at a remote monitoring location, said form driven operating system comprising form control data and at least one form presented to a user by said form driven operating system for eliciting data input from the user of the transaction type accepted by said server, said at least one form including at least one prompt customized to said transaction type accepted by the server for eliciting at least one of patient symptoms, patient complaints, patient history, and vital signs data, and a form/menu memory which stores said at least one form, said method comprising the steps of:

presenting to said display said at least one form including said at least one prompt for eliciting at least one of patient symptoms, patient complaints, patient history, and vital signs data;

said user periodically completing said at least one form by entering data responsive to prompts in said at least one form into said transaction entry device using said input device;

said form driven operating system formatting at least the responsive data entered by said user in response to said prompts in said at least one form into a data transaction for transmission to said server;

transmitting said data transaction to said server for review by medical personnel;

said server receiving said data transaction; and determining if patient symptoms, patient complaints, patient history, or vital signs data in said data transaction indicates a change in the patient's condition since receipt of a previous data transaction from said patient and, if so, responding with an appropriate medical response to said change.

31. A method as in claim 30, comprising the additional step of continuously transmitting at least said vital signs data to said server as data transactions for real-time monitoring by said medical personnel.

32. A method as in claim 30, wherein said determining step comprises the steps of determining if said change indicates that said patient's condition is critical, and if so, sending at least one of medical personnel, changed instructions, and changed medication to the patient's location.

33. A method as in claim 30, wherein said determining step comprises the step of responding with an appropriate medical response to said change includes the step of downloading a new form to the patient for completion, transmission to said server upon completion, and review by said medical personnel.

34. A communications network comprising:

first and second processing devices each comprising a microprocessor and a computer readable medium which stores a form driven operating system which controls said microprocessor to accept input data of a desired transaction type using control data comprising at least one form presented to a user by said form driven operating system for eliciting data input of said desired transaction type from said user, said at least one form including at least one prompt customized to said desired transaction type, said form driven operating system further formatting at least any data input by said user in response to said at least one prompt into a data transaction for processing, and a which stores form/menu memory which stores said at least one form;

a common data communications line connecting said first and second processing devices to each other;

a first modem which provides a cellular, wired and/or wireless communications connection between said first processing device and said common data communications line; and a second modem which provides a cellular, wired or wireless communications connection between said second processing device and said common data communications line, wherein each data transaction output by one of said processing devices includes an address of a destination processing device, and each processing device includes a receiver which only receives data transactions addressed to it and ignores all other data transactions received from said common data communications line.

35. A network as in claim 34, wherein said common data communications line comprises one of a radio-frequency cable, an optical fiber cable, and a low power wireless connection, and said first and second modems each comprise null modems.

36. A method of providing communications over a common data communications line connecting first and second processing devices each comprising a microprocessor, a display, and input device, and a computer readable medium which stores a form driven operating system which controls said microprocessor to accept input data of a desired transaction type using control data comprising at least one form presented to a user by said form driven operating system for eliciting data input of said desired transaction type from said user, said at least one form including at least one prompt customized to said desired transaction type, said form driven operating system further formatting at least any data input by said user in response to said at least one prompt into a data transaction for processing, and which stores a form/menu memory which stores said at least one form, comprising the steps of:

presenting to said display of said first processing device said at least one form including said at least one prompt for eliciting said data input of said desired transaction type from said user;

said user completing said at least one form by entering data responsive to prompts in said at least one form into said first processing device using said input device;

said form driven operating system formatting at least the responsive data entered by said user in response to said prompts in said at least one form into a data transaction, said data transaction having a destination address which identifies a destination processing device which is to process said data transaction;

transmitting said data transaction over said common data communications line; and if said destination address matches an address of said second processing device, said second processing device receiving said data transaction; otherwise, said second processing device ignoring said data transaction.

* * * * *